US012678994B2

(12) United States Patent
Krans

(10) Patent No.: US 12,678,994 B2
(45) Date of Patent: Jul. 14, 2026

(54) METHOD OF MANUFACTURING NAIL-LAMINATED TIMBER (NLT) AND MACHINE THEREFOR

(71) Applicant: 1000110154 Ontario Inc., New Lowell (CA)

(72) Inventor: Michael Krans, Caledon East (CA)

(73) Assignee: 1000110154 ONTARIO INC., New Lowell (CA)

( * ) Notice: Subject to any disclaimer, the term of this patent is extended or adjusted under 35 U.S.C. 154(b) by 0 days.

(21) Appl. No.: 19/008,341

(22) Filed: Jan. 2, 2025

(65) Prior Publication Data

US 2026/0183984 A1 Jul. 2, 2026

(51) Int. Cl.
*B27F 7/00* (2006.01)
*B27F 7/02* (2006.01)
*B27M 3/00* (2006.01)

(52) U.S. Cl.
CPC ................ *B27F 7/003* (2013.01); *B27F 7/02* (2013.01); *B27M 3/0073* (2013.01); *Y10T 29/49833* (2015.01); *Y10T 29/53317* (2015.01); *Y10T 29/5343* (2015.01)

(58) Field of Classification Search
CPC . B27F 7/003; B27M 3/0073; Y10T 29/49833; Y10T 29/53317; Y10T 29/5343
See application file for complete search history.

(56) References Cited

U.S. PATENT DOCUMENTS 3,591,067 A * 7/1971 Vial .......................... B27F 7/04 227/100
3,866,644 A * 2/1975 Stubbs ................. B27M 3/0073 269/910
3,968,560 A * 7/1976 Vial ..................... B27M 3/0073 29/430
3,990,937 A 11/1976 Knowles
4,403,388 A * 9/1983 Belcher ................ B27M 3/0073 227/7
4,541,618 A 9/1985 Bruno
4,699,363 A 10/1987 Semmler
4,776,919 A 10/1988 Troutner et al.
4,867,819 A * 9/1989 Richardelli .............. B27M 3/34 156/364

(Continued)

FOREIGN PATENT DOCUMENTS

AT 502177 B1 2/2007
CA 2128845 A1 1/1995

(Continued)

OTHER PUBLICATIONS

"Engineered Wood"—Wikipedia, dated Jul. 10, 2023.

*Primary Examiner* — Jermie E Cozart

(74) *Attorney, Agent, or Firm* — Nicholas Garner; Oyen Wiggs Green & Mutala LLP

(57) ABSTRACT

There is provided a nail-laminated timber (NLT) machine. The machine includes a press. The machine includes an infeed via which first and second boards are received in the press. The machine includes a positioning member via which a size of a gap between the first and second boards is programmable, adjustable and/or customizable. Actuation of the press promotes fixing in place of the boards so positioned and/or the size of the gap thereafter. The machine includes a nail gun configured to nail together the first and second boards so fixed in place.

25 Claims, 8 Drawing Sheets

(56) References Cited

U.S. PATENT DOCUMENTS

| | | | | | |
|---|---|---|---|---|---|
| 4,876,787 | A * | 10/1989 | Ditty | B27F 7/003 29/430 |
| 5,095,605 | A * | 3/1992 | Tonus | B27F 7/003 227/7 |
| 5,249,352 | A * | 10/1993 | Landers | B27M 3/0073 227/111 |
| 5,375,315 | A * | 12/1994 | Griffith | B23P 19/041 29/772 |
| 6,058,601 | A * | 5/2000 | DeKoning | B27F 7/003 198/456 |
| 6,430,800 | B1 * | 8/2002 | Buck | B27F 7/13 29/430 |
| 10,260,232 | B1 | 4/2019 | Conboy | |
| 10,311,444 | B1 | 6/2019 | Conboy | |
| 10,332,222 | B1 | 6/2019 | Conboy | |
| 10,430,757 | B2 | 10/2019 | Conboy | |
| 11,014,264 | B2 | 5/2021 | Dong | |
| 2003/0172524 | A1 * | 9/2003 | Glenn | B27M 3/0073 29/809 |
| 2007/0220825 | A1 | 9/2007 | Davis | |
| 2017/0138049 | A1 | 5/2017 | King | |
| 2018/0215067 | A1 * | 8/2018 | Wagner | B27F 7/003 |
| 2019/0126508 | A1 | 5/2019 | Morf | |
| 2020/0299962 | A1 | 9/2020 | Espinosa | |
| 2022/0213684 | A1 | 7/2022 | Besjak et al. | |
| 2023/0089385 | A1 | 3/2023 | Hinkle et al. | |

FOREIGN PATENT DOCUMENTS

| | | | |
|---|---|---|---|
| CN | 113602760 | A | 11/2021 |
| CN | 219359712 | U | 7/2023 |
| DE | 1005263 | B | 3/1957 |
| DE | 3027873 | A1 | 3/1982 |
| DE | 19616881 | C1 | 3/1997 |
| DE | 10224912 | A1 | 12/2003 |
| DE | 102021107909 | A1 | 9/2022 |
| EP | 0607480 | B1 | 11/1997 |
| EP | 0925890 | A1 | 6/1999 |
| EP | 1369214 | A2 | 12/2003 |
| EP | 2100704 | B1 | 12/2010 |
| EP | 2618972 | B1 | 12/2017 |
| EP | 3208060 | B1 | 11/2021 |
| GB | 969843 | A | 9/1964 |
| JP | S6190838 | A | 5/1986 |
| JP | 3421131 | B2 | 6/2003 |
| WO | 1992012835 | A2 | 8/1992 |
| WO | 2012104100 | A1 | 8/2012 |

* cited by examiner

METHOD OF MANUFACTURING NAIL-LAMINATED TIMBER (NLT) AND MACHINE THEREFOR

BACKGROUND OF THE INVENTION

Field of the Invention

There is provided a method of manufacturing mass timber products. In particular, there is provided a method of manufacturing nail-laminated timber (NLT) and a machine therefor.

Description of the Related Art

German Patent No. DE 196 16 881 C1 to Schmidler et al. discloses a flooring panel assembled from thin layers of scrap wood by feeding them to a jig which stacks them into a vertical array. The nailing jig moves in a programmed pattern to nail the topmost layer to the stack without striking any nails in previous layers. This is achieved by a simple stepping pattern which is repeated after a set number of layers. The process can be programmed to omit nails from selected areas which will later be cut out. These correspond to vertical feeds in the construction of the building e.g. flue ducts, supply ducts. Longer panels are made by offsetting the layers to obtain a strong floor panel.

U.S. Pat. No. 10,430,757 to Conboy discloses Class-A fire-protected mass timber building components, including cross-laminated timber (CLT), glue laminated timber (GLT) and nail-laminated timber (NLT). Multiple layers of Class-A fire-protection are provided to the multiple timber lamination layers so as to provided defend the CLT building components against fire, ground movement and high wind loads. Methods, systems and networks are provided for producing and managing the quality of such Class-A fire-protected mass timber building components.

The above-described prior art may suffer a number of disadvantages.

BRIEF SUMMARY OF INVENTION

There is provided, and it is an object to provide, an improved method of manufacturing nail-laminated timber (NLT) and a machine therefor, disclosed herein.

There is accordingly provided an apparatus or machine for automating manufacture of nail-laminated timber (NLT) comprising at least first and second boards. The apparatus or machine includes a positioning member configured to abut with the first board. Positioning of the positioning member is incrementally adjustable in an outfeed direction to both receive a second board adjacent the first board and customize a size of a gap between the first and second boards corresponding to desired dimensions of the NLT. The apparatus or machine includes a nail gun configured to nail together the first and second boards thereafter.

There is also provided an apparatus or machine for automating manufacture of nail-laminated timber (NLT) according to another embodiment. The NLT comprises a plurality of fastened-together layers of dimensioned lumber. The apparatus or machine includes a positioning member indexable along a first axis. The positioning member is configured to abut with a first layer of dimensioned lumber in the NLT. The apparatus or machine includes one or more nail guns configured to nail together the first layer and an adjacent second layer of dimensioned lumber in the NLT.

The positioning member is configured to adjust and/or customize the size of the gap between the first and second layer.

There is further provided a nail-laminated timber (NLT) machine or apparatus according to an additional aspect. The apparatus or machine includes a press. The apparatus or machine includes an infeed via which first and second boards are received in the press. The apparatus or machine includes a positioning member configured to customize and/or adjust the size of a gap between the first and second boards. Actuation of the press promotes fixing in place of the size of the gap thereafter. The apparatus or machine includes a nail gun configured to nail together the first and second boards so fixed in place.

There is yet also provided a nail-laminated timber (NLT) machine or apparatus according to a further aspect. The apparatus or machine includes a processor via which desired dimensions of the NLT are inputted. The apparatus or machine includes a positioning member indexed to control, customize and/or adjust a size of a gap between adjacent boards in real-time based on the desired dimensions of the NLT and one or more of real-time moisture content or actual dimensions of the boards. The apparatus or machine includes a press via which the adjacent boards so positioned are held in place. The apparatus or machine includes a nail gun configured to nail together the adjacent boards so held in place.

There is additionally provided a nail-laminated timber (NLT) machine or apparatus according to yet another aspect. The apparatus or machine includes a positioning member configured to customize and/or adjust a size of a gap between the first and second boards. The apparatus or machine includes a press actuation of which promotes fixing in place of the first and second boards so positioned. The apparatus or machine includes a nail gun configured to nail together the first and second boards so pressed in place.

There is also provided according to a further aspect an apparatus or machine for manufacturing nail-laminated timber (NLT). The apparatus or machine includes a press moveable along a first or press axis. The press includes a plurality of longitudinally spaced-apart biasing members configured to selectively bias first and second boards. The apparatus or machine includes one or more nail guns configured to nail together the first and second boards so biased. The press axis is generally or substantially perpendicular to a plane defined by the NLT and/or an outfeed axis and/or outfeed plane.

There is further provided according to an additional aspect an apparatus or machine for automating manufacture of nail-laminated timber (NLT). The NLT includes a plurality of fastened-together layers of dimensioned lumber. The apparatus or machine includes a press moveable along a first axis to selectively bias against first and second said layers of dimensioned lumber. The apparatus or machine includes one or more nail guns configured to nail together the first and second said layers of dimensioned lumber so biased. The apparatus or machine includes an outfeed positioning member indexable along a second axis generally or substantially perpendicular to the first axis to create a space to permit the press to receive a third said layer of dimensioned lumber for pressing with the second said layer of dimensioned lumber, with the one or more nail guns thereafter nailing together the third and second said layers of dimensioned lumber. The positioning member so indexed is configured to adjust and/or customize a gap between adjacent said layers of dimensioned lumber in real-time.

There is also provided according to one aspect a method of manufacturing nail-laminated timber (NLT). The method includes indexing a positioning member along or substantially parallel to a first or outfeed axis and/or outfeed plane. The positioning member abuts with a first board. The method includes customizing a size of a gap between the first board and an adjacent second board via the positioning member. The method includes nailing together the first and second boards so positioned.

There is further provided according to another aspect a method of manufacturing of nail-laminated timber (NLT). The method includes infeeding first and second boards into a press. The method includes customizing and/or adjusting a size of a gap between the first and second boards via a positioning member. The method includes next actuating of the press against the first and second boards so as to promote fixing in place of the size of said gap. The method includes nailing together via a nail gun the first and second boards so fixed in place.

There is additionally provided according to a further aspect a method of manufacturing of nail-laminated timber (NLT) comprising a plurality of boards. The method includes inputting into a processor desired dimensions of the NLT. The method includes indexing a positioning member to control, customize and/or adjust a size of a gap between adjacent said boards in real-time based on said desired dimensions of the NLT and one or more of real-time moisture content or actual dimensions of the boards. The method includes holding in place via a press the adjacent said boards so positioned. The method includes nailing together via a nail gun the adjacent said boards so held in place.

There is further provided according to an additional aspect a method of manufacturing of nail-laminated timber (NLT) comprising a plurality of boards. The method includes customizing and/or adjusting a size of a gap between first and second said boards via a positioning member. The method includes fixing in place via a press the first and second boards so positioned. The method includes nailing together via a nail gun the first and second boards so pressed in place.

There is also provided according to another aspect a method of manufacturing of nail-laminated timber (NLT) comprising a plurality of boards. The method includes biasing in place first and second said boards via a plurality of longitudinally spaced-apart biasing members moveable along a first or press axis which is generally or substantially perpendicular to a plane defined by the NLT and/or an outfeed axis and/or outfeed plane. The method includes nailing together via one or more nail guns the first and second boards so biased.

There is additionally provided according to a yet further aspect a method of manufacturing of nail-laminated timber (NLT) comprising a plurality of boards. The method includes actuating a press moveable along a first axis so as to selectively bias against first and second said layers of dimensioned lumber. The method includes nailing together via one or more nail guns the first and second said layers of dimensioned lumber so biased. The method includes indexing an outfeed positioning member along a second axis generally or substantially perpendicular to the first axis so as to create a space to permit the press to receive a third said layer of dimensioned lumber for pressing with the second said layer of dimensioned lumber, with the one or more nail guns thereafter nailing together the third and second said layers of dimensioned lumber. The positioning member so indexed is configured to adjust and/or customize a gap between adjacent said layers of dimensioned lumber in real-time.

It is emphasized that the invention relates to all combinations of the above features, even if these are recited in different claims.

Further aspects and example embodiments are illustrated in the accompanying drawings and/or described in the following description.

BRIEF DESCRIPTION OF DRAWINGS

The accompanying drawings illustrate non-limiting example embodiments of the invention.

DESCRIPTION OF THE PREFERRED EMBODIMENTS

Figure 1:
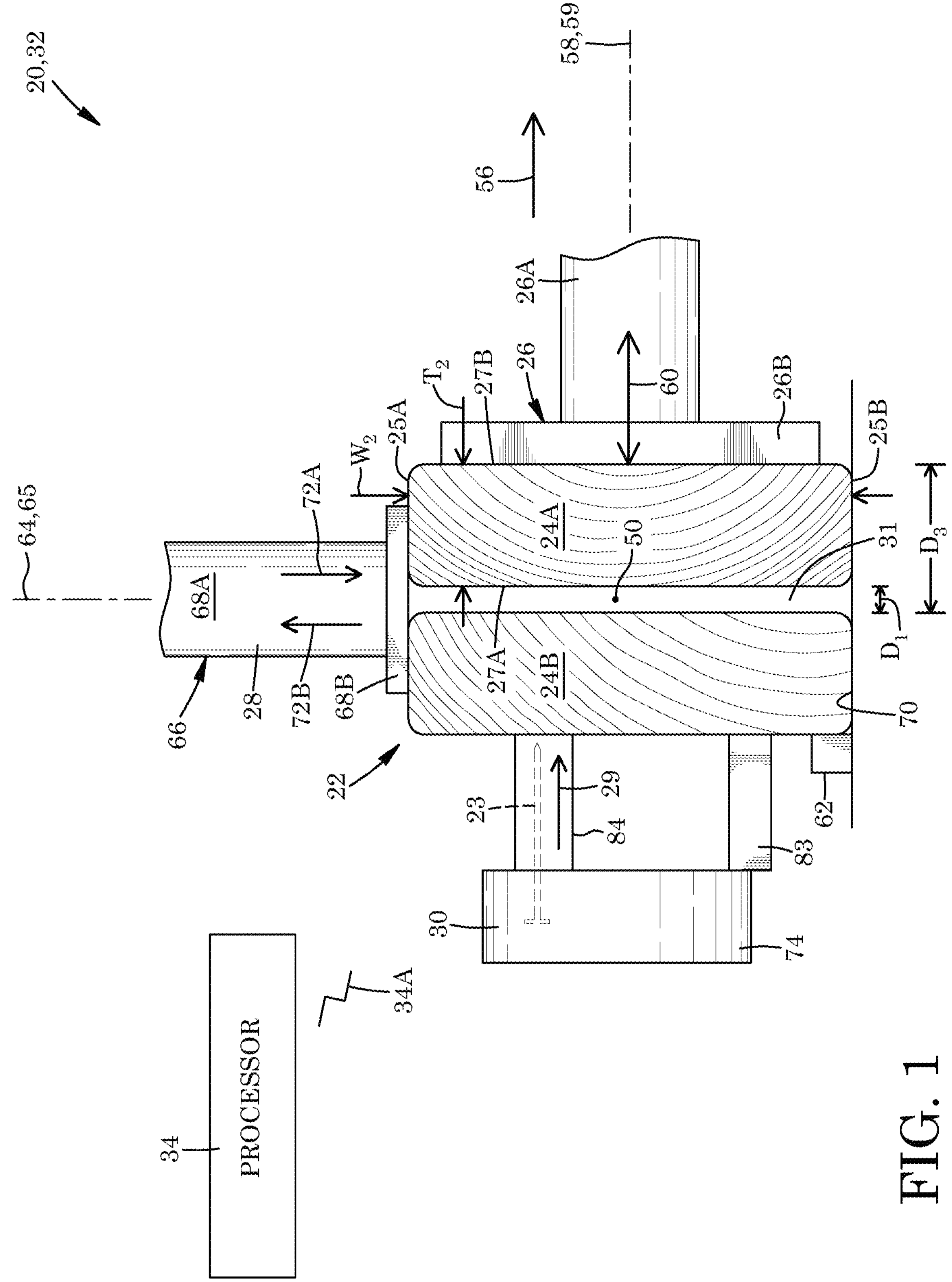
FIG. 1 is a simplified schematic side view of a nail-laminated timber (NLT) machine according to one aspect, with first and second of a plurality of boards shown in the process of being positioned, next fixed in place and then nailed together.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Referring to the drawings and first to FIG. 1, there is shown a machine 20 for automating manufacture of mass timber, in this example nail-laminated timber (NLT), with the NLT being in panel form and hereinafter being referred to as a mass timber panel or nail-laminated mass timber panel 22. NLT machine 20 may include or be referred to as an apparatus for automating manufacture of mass timber, or an NLT apparatus.

Panel 22 comprises a plurality of boards 24A, 24B . . . 24N which are nailed together via one or more and in this example a plurality of nails 23. Each board in this non-limiting embodiment comprises dimensioned lumber and/or is a part of a respective layer of dimensioned lumber. Each board may be referred to as a lamination of the panel. Adjacent boards 24A and 24B of panel 22 include a gap 31 spanning therebetween. NLT machine 20 includes a positioning member 26 configured to customize and/or adjust the size of the gap between adjacent boards. The positioning member is servo-controlled and is indexed and/or travels known distances to this end in one non-limiting embodiment. The customization and/or adjustment of the size of the gap may involve taking into account one or more of a moisture content of boards 24, one or more dimensions of the boards, or one or more desired overall dimensions of the panel. NLT machine 20 includes a biasing member, in this example an NLT press 28 actuation of which promotes fixing in place of the adjacent so positioned. NLT machine 20 includes one or more nail guns 30 configured to nail together the first and second boards so pressed in place, as shown by nail 23 in the process of being hammered in direction 29 into boards 24B and 24A. The NLT machine alternatively may be referred to as an or the NLT press with positioning member 26 and one or more nail guns 30 operatively connected to and/or a part thereof. This process of positioning of adjacent boards including gap adjustment/customization therebetween, fixing in place the adjacent boards so positioned, and thereafter nailing together the adjacent boards so positioned/fixed in place, is repeated for successive pairs of adjacent boards until a panel of desired dimensions is completed.

The following is a non-limiting embodiment which achieves the above functionality.

Figure 2:
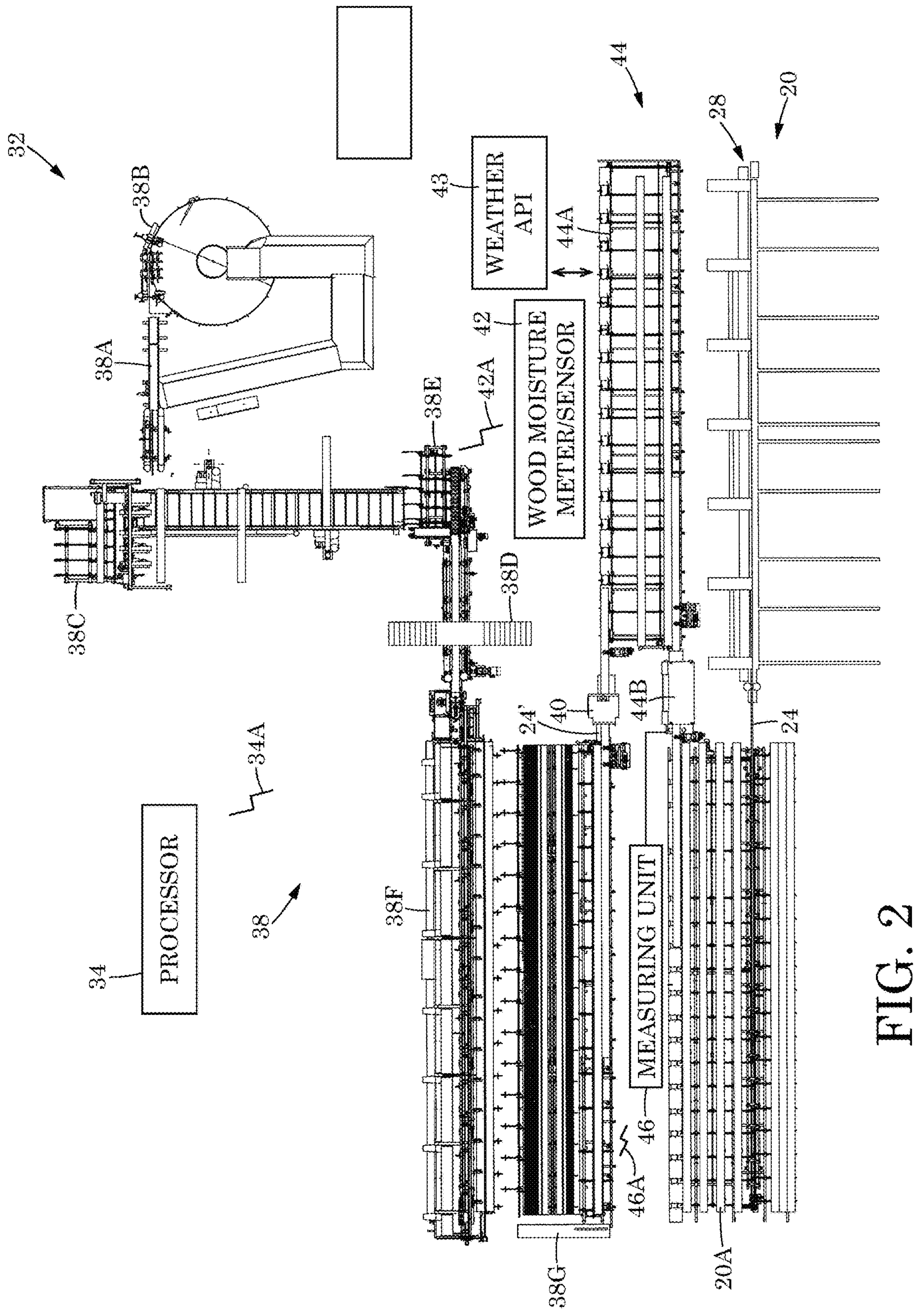
FIG. 2 is a schematic top view of a non-limiting embodiment of a nail-laminated timber (NLT) manufacturing line and assembly comprising the NLT machine of FIG. 1.

NLT machine 20 in this non-limiting example is part of an NLT manufacturing assembly 32 seen in FIG. 2. The NLT manufacturing assembly may be referred to as a NLT manufacturing system or mass timber panel manufacturing system or assembly.

Figure 3:
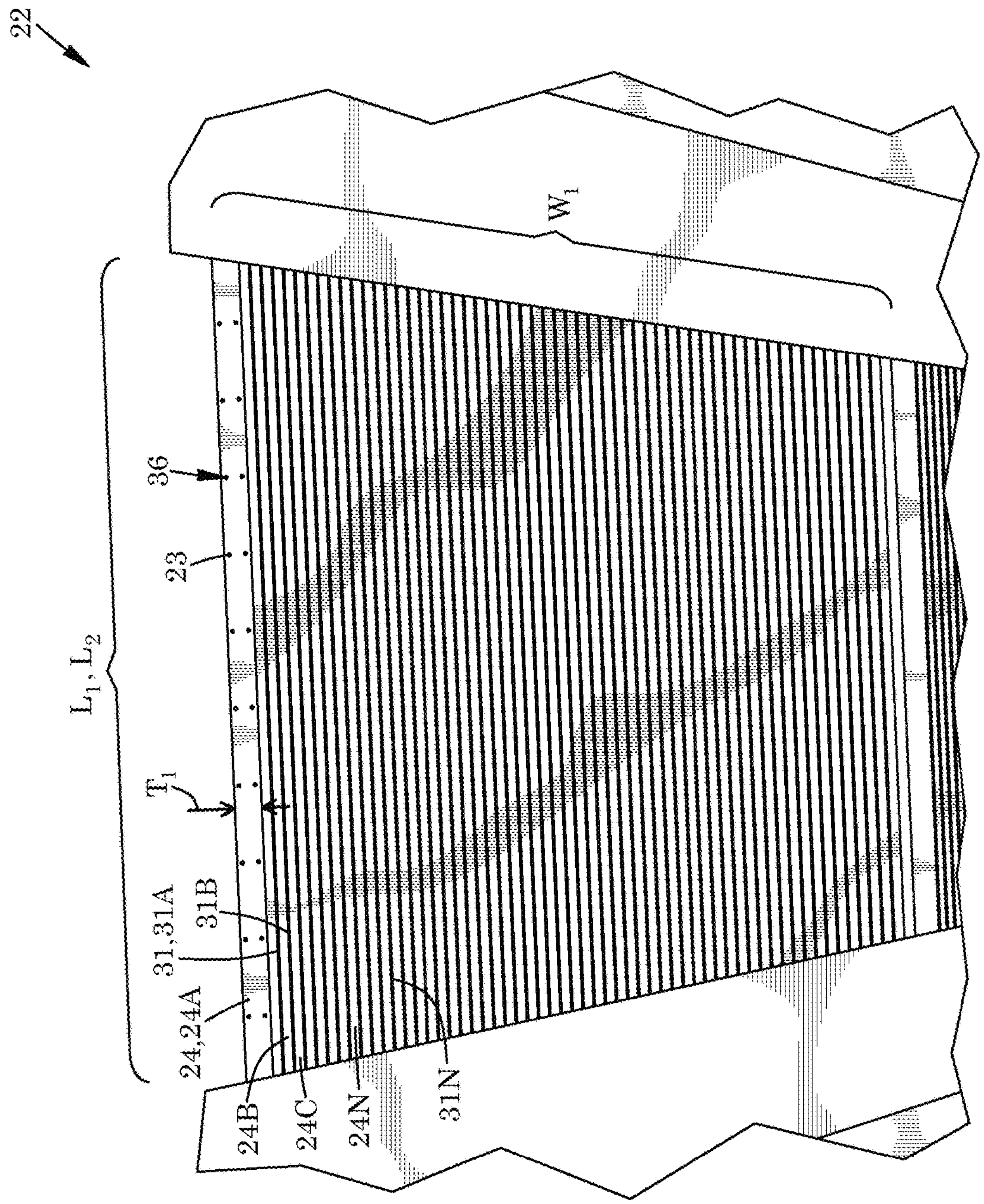
FIG. 3 is a bottom, front perspective view of NLT manufactured via the NLT manufacturing line and assembly of FIG. 2, with the NLT in this non-limiting example being a ceiling of a room or enclosure shown in fragment.

Assembly 32 in this non-limiting embodiment includes a processor 34 and/or memory thereof. The processor may include or be referred to as a controller or part of a servo-controller or, alternatively, there may be provided a controller or servo-controller comprising the processor. Processor 34 (or memory thereof) is configured to receive data inputted therein corresponding to desired properties of panel 22 to be manufactured as seen in FIG. 3. As seen in FIG. 3, this may include desired overall length $L_1$, width $W_1$ and thickness $T_1$ of the panel within a predetermined threshold. Desired dimensions of the panel are thus inputted into processor 34 seen in FIG. 2.

Referring to FIG. 1, the desired properties of the panel may also include a desired size or spanning distance $D_1$ of gap 31 or gap size range spanning adjacent boards 24A and 24B comprising the panel. This may be advantageous to take into account the actual or estimated moisture content of the given boards and/or the type of boards (e.g. type of wood or the like) which are to be nailed together so as to manufacture panel 22.

As seen in FIG. 3, the desired properties of the panel may optionally additionally include a desired nail pattern 36 via which boards 24 of the panel are coupled together. Alternatively, processor 34 seen in FIG. 2 may be configured to receive above inputted data therein in part or in full, and determine a required or preferred nail pattern based thereon.

Still referring to FIG. 2, NLT manufacturing assembly 32 includes in this non-limiting embodiment a finger-jointing unit 38. The finger-jointing unit may be referred to as a press and finger joint production stage or unit or a finger-jointing machine. Finger-jointing unit 38 is configured to finger joint together a plurality of shorter boards 38A so as to form longer boards 24'. Each shorter board may comprise a piece of solid wood, with a specifically designed profile, such as wedge-shaped, teeth being formed/cut via finger-jointing unit in the end portions of adjacent pairs of the shorter boards. The end portions of the shorter boards so formed/cut are configured to interlock together with adhesive or glue also being applied via the finger-jointing unit to promote formation of longer boards from the shorter boards. In this non-limiting example, finger-jointing unit 38 includes a short block or board infeed 38B via which short boards are fed into the unit and optionally a long board infeed 38C via which relatively longer boards are fed into the unit. Each board may range in lumber size from nominal sizes of 2×4 through to 2×12 in one non-limiting embodiment, where each board inputted into finger-jointing unit having a length in the range of 9 inches to 12 feet in one non-limiting example; however, this is not strictly required and other dimensions/lengths may be accommodated/used in other embodiments. Finger-jointing unit 38 includes a board assembly machine 38D downstream of the short and longer board infeeds and in this non-limiting example operatively connected thereto via a corner wood transfer conveyor mechanism 38E; however, the latter is not strictly required. The board assembly machine is configured to couple and glue together the short and/or long boards to form longer boards, of relatively longer, straight lengths.

Finger-jointing unit 38 includes a press, in this example a finger-jointing press 38F. The finger-jointing press may be referred to as a first press of NLT manufacturing assembly 32. Finger-jointing press 38F is configured to automatically/further press together the short and/or long boards so assembled/glued-to-each-other along their edges or thinner ends so as to form longer boards 24' which are substantially straight and consistent within a predetermined threshold. Finger-jointing unit 38 is configured to continuously join together shorter and/or long boards one after another to create an elongate longer board of potentially indefinite length. This longer board is then cut to a rough length when it exits press 38F in this example. A secondary saw (trim saw) may subsequently cut the length to the precise length needed for a given panel 22 seen in FIG. 3.

Finally, the finger-jointing unit includes an accumulator, in this example a vertical accumulator 38G via which the longer boards so formed are stored and/or to enable the glue or adhesive to cure for a predetermined amount of time (e.g. 10-15 minutes in one non-limiting example). The process of finger-jointing, including its various stages, parts, and functionings, is known per se and finger-jointing unit will accordingly not be described in further detail. In other embodiments, finger-jointing unit 38 is not strictly required and assembly may in such cases begin with longer boards 24 seen in FIG. 3 rather than first forming longer boards via shorter boards.

Referring back to FIG. 2, NLT manufacturing assembly 32 includes in this non-limiting embodiment a woodworking machine, in this example automated wood planer, in this case a wood planing machine 40 downstream of the finger-jointing unit. The wood planing machine or planer unit comprises a four-sided planer in this example. Wood planing machine 40 is configured to remove a relatively small amount of wood from each side of the board to create a dimensional cross section with dimensions consistent within a predetermined threshold. The wood planing machine is thus configured to plane longer boards 24 to create planed boards 24A and 24B in the form of dimensioned lumber seen in FIG. 3 in this example. As seen in FIG. 1, each planed longer board 24A is generally or substantially rectangular in cross-section, with a pair of thinner cross-sectional or laterally-extending ends, in this case upper end 25A and lower end 25B, with the ends spanning a distance or thickness $T_2$. The upper and lower ends of boards 24A may be referred to as thicknesses, edges, lateral ends and/or thickness ends of the boards. Each planed board has a pair of thicker cross-sectional or laterally-extending ends or sides, in this case first or proximal side 27A and second or distal side 27B, with the sides spanning a distance or width $W_2$. The sides of boards 24A may be referred to as widths, lateral faces, lateral sides and/or side ends of the boards. For each board 24A, sides 27A and 27B thereof extend between ends 25A and 25B thereof.

As seen in FIG. 3, each board has a longitudinally-extending length $L_2$. Wood planing machines, including their various parts and functionings, are known per se and wood planing machine 40 seen in FIG. 2 will accordingly not be described in further detail. In other embodiments, the wood planing machine is not strictly required and assembly may in such cases begin with and/or use longer boards 24A and 24B seen in FIG. 3 of known dimensions and/or whose dimensions are measured subsequently to determine suitability of the same.

Referring back to FIG. 2, NLT manufacturing assembly 32 includes in this non-limiting embodiment a humidity and/or moisture sensor, in this example a wood moisture meter/sensor 42. Wood moisture meter 42 is downstream of wood planing machine 40 in this non-limiting embodiment. Wood moisture meter/sensor 42 is configured to determine and/or estimate in real-time actual or instantaneous moisture content of boards 24 so planed and emit one or more signals 42A based thereon. The wood moisture meter is configured to operatively connect to and communicate with processor 34, which is configured to receive said one or more signals. Such actual/instantaneous wood moisture data so obtained is thus received by the processor and/or stored in memory thereof for subsequent use according to one non-limiting embodiment. Wood moisture meters/sensors, including their various parts and functionings, are known per se and wood moisture meter/sensor 42 will accordingly not be described in further detail. In other embodiments, the wood moisture meter is not strictly required and NLT manufacturing assembly 32 may in such cases input into processor 34 (or memory thereof) an estimate of the moisture content of the boards based on prior data and/or past experience and/or based on actual or instantaneous air humidity levels and/or relative humidity levels, for example. In one non-limiting example, NLT manufacturing assembly 32 may include a weather application programming interface (API) 43 integrated with processor 34 to obtain relative humidity level data or information in real-time from which wood moisture may be determined or estimated.

The NLT manufacturing assembly includes in this non-limiting embodiment a wood coating unit 44 downstream of finger-jointing unit 38, wood planing machine 40 and wood moisture meter/sensor 42. The wood coating unit is configured to coat and/or dip the planed boards with a wood sealer and may be referred to as a flow coating sealer application machine. Wood coating unit 44 in this non-limiting embodiment includes a sealant applicator infeed 44A and a sealant applicator, in this example a sealant linear applicator 44B operatively connected to the infeed so as to selectively coat longer boards passing therethrough with wood sealer or sealant. Wood coating unit 44 applies a thin coating of sealer to each board as it moves therethrough. The sealer in one embodiment is a fast-dry product configured to seal the pores of the wood and providing moisture protection thereto for a predetermined amount of time (e.g. 3 to 6 months in one non-limiting embodiment). Wood coating unit in this non-limiting example comprises a Sarmax™ type flow coating sealer application machine, which may be purchased at Sarmax S.r.l., having an address of Via Archimede, 75, 41019 Soliera MO, Italy; however, this is not strictly required and other types of wood coating units may be used/provided in other embodiments. Wood coating units, including their various stages, parts and functionings, are known per se and wood coating unit 44 will accordingly not be described in further detail. In other embodiments, the wood coating unit is not strictly required and assembly may in such cases begin with and/or use longer boards which are uncoated or pre-coated, for example.

NLT manufacturing assembly 32 includes in this non-limiting embodiment a measuring device/unit 46 downstream of wood coating unit 44, wood moisture meter/sensor 42, and/or wood planing machine 40. The measuring device or unit is configured to measure in real-time actual and/or instantaneous dimensions of the dimensioned lumber, planed boards 24 and/or planed boards so coated. Measuring device/unit 46 is configured to measure the actual and/or instantaneous dimensions and emit one or more signals 46A based thereon, prior to the boards being nailed together via NLT machine 20. The measuring device or unit is configured to operatively connect to and communicate with processor 34, which is configured to receive said one or more signals. Such actual/instantaneous board dimension data so obtained is thus received by the processor and/or stored in memory thereof for subsequent use according to one non-limiting embodiment. The dimensions of boards 24A and 24B are thus measured in real-time via measuring device/unit 46 seen in FIG. 2 prior to infeeding into NLT machine 20.

Alternatively, NLT manufacturing assembly 32 may omit measuring device/unit 46 in other embodiments where, for example, wood planing machine 40 is determined to be sufficiently precise and/or reliable in its outputting of dimensioned lumber within acceptable and/or known tolerances. In this case the wood planing machine may be configured to emit a signal to processor 34 indicative of the dimensions of the boards so planed in real-time. In addition or alternatively, wood planing machine 40 may be configured to incorporate therein a measuring device or unit which is configured to measure the actual and/or instantaneous dimensions of the boards while and/or upon being planed. As a further alternative, NLT machine 20 may incorporate measuring device/unit 46 therewithin, such that as boards are fed therein, the board's dimensions and length are confirmed automatically and compared with the data file for the specific panel 22 seen in FIG. 3, where if the board is deemed incorrect, an operator is alerted to verify or correct the same.

Further particulars of a non-limiting embodiment of NLT machine 20 will now be described in more detail.

As seen in FIG. 2, the NLT machine includes an NLT machine infeed unit 20A downstream of wood coating unit 44 and in this example downstream of measuring device/unit 46. Alternatively, the measuring device or unit may be downstream of the NLT machine infeed unit and/or incorporated into and/or or considered to be a part of the NLT machine. NLT press 28 is downstream of NLT machine infeed unit 20A and configured to selectively receive individual longer boards 24 therefrom in an infeed direction indicated by arrow 48 along a first, infeed or longitudinal axis 50 of NLT machine 20 seen in FIG. 4. The infeed axis and The NLT press may be referred to as a second press of NLT manufacturing assembly 32. The dimensions of the longer boards may thus be measured in real-time via measuring device/unit 46 during or prior to infeeding into press 28.

Figure 4:
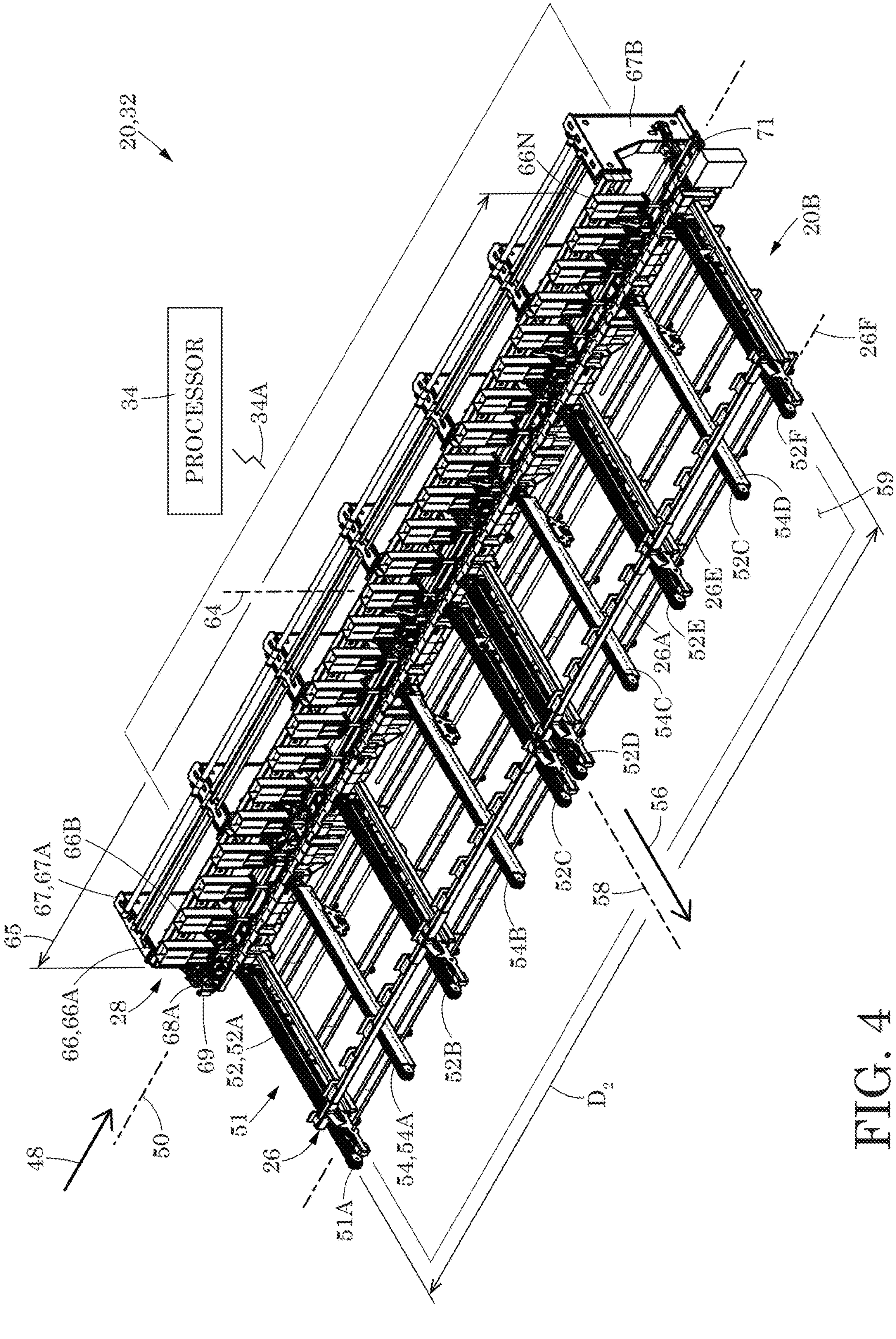
FIG. 4 is a top, left side, outfeed end perspective view of a non-limiting embodiment of the NLT machine of FIG. 2, with the NLT machine including an outfeed unit with a conveyor and a positioning member selectively indexable along an outfeed plane so as to customize/adjust the size of the gap between adjacent boards, with the NLT machine including a press with a plurality of biasing members moveable perpendicular to the outfeed plane so as to selectively hold in place the adjacent boards so positioned, and with the NLT machine including a plurality of nail guns configured to selectively nail together successive pairs of adjacent boards so selectively held in place.

As seen in FIG. 4, NLT machine 20 includes an NLT machine outfeed unit 20B. The outfeed unit may be referred to as a press outfeed. NLT machine outfeed unit 20B is configured to support the panel as it is being incrementally manufactured. Outfeed unit 20B includes a conveyor 51 in this non-limiting example operatively connecting to processor 34 via one or more actuators 51A. The conveyor comprises one or more and in this example a plurality of endless belts 52A, 52B, 52C, 52D, 52E and 52F configured to abut with and support the panel as the panel is being progressed formed. The belts are selectively rotatable via actuators 51A. The number of endless belts 52 may correspond to the overall desired length of the panel, with in this non-limiting embodiment the distance of separation $D_2$ between proximal endless belt 52A and distal endless belt 52F being generally, approximately or substantially equal to length $L_1$ of panel 22 seen in FIG. 3. The distance of separation and thus the potential maximum length of the panel is equal to 60 feet in one non-limiting embodiment; however, this is not strictly required and NLT machine 20 may be longer or short in longitudinal span in other embodiments.

Outfeed unit 20B includes one or more and in this example a plurality of longitudinally spaced-apart and laterally-extending positioning member actuators, in this non-limiting example linear actuators, in this non-limiting case in the form of one or more and in this example a plurality of longitudinally spaced-apart and laterally-extending ball screws 54A, 54B, 54C and 54D. Processor 34 operatively connects to and is in communication with the ball screws, as shown by signal 34A, so as to incrementally and/or selectively actuate the same.

Conveyor 51, endless belts 52 and ball screws 54 extend in this example in a second or outfeed direction 56 along or parallel to a second, lateral or outfeed axis 58 and/or outfeed plane 59. The outfeed axis and outfeed plane are angled relative to and in this non-limiting embodiment perpendicular to longitudinal axis 50 of NLT machine 20. The longitudinal axis, outfeed axis and outfeed plane all align and extend perpendicular to the direction of gravity, as well as extending horizontally in this non-limiting embodiment and may thus be referred to as first and second horizontal axes and a horizontal plane; however, this orientation is not strictly required.

Positioning member 26 operatively connects to ball screws 54 and is selectively and/or incrementally moveable thereby along or substantially parallel to outfeed axis 58 to create space for successive boards 24A and 24B (seen in FIG. 1) to be coupled together. The positioning member so driven by the ball screws may function to inhibit or prevent chain slippage. The successive boards are moveable substantially along and/or parallel outfeed axis 58 and/or outfeed plane 59. Referring back to FIG. 4, processor 34 thus operatively couples to and selectively/incrementally adjusts positioning of and/or moves positioning member via the ball screws in this example.

Figure 6:
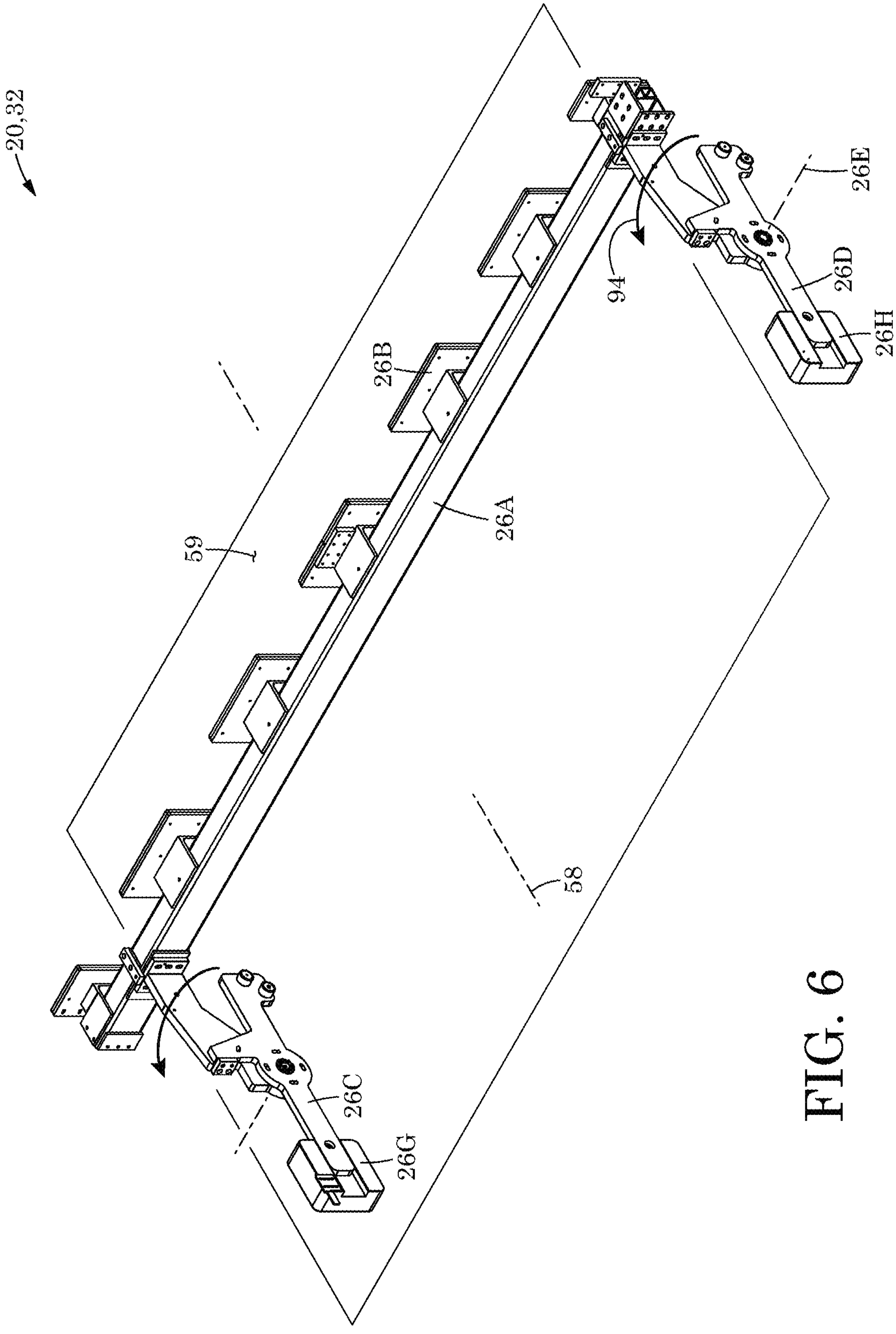
FIG. 6 is a top, left side, front perspective view of the positioning member of the outfeed unit of the NLT machine of FIG. 4.

Positioning member 26 extends longitudinally and parallel to longitudinal axis 50 of NLT machine 20 in this non-limiting example. As seen in FIG. 6, the positioning member in this non-limiting embodiment includes an elongate shaft or beam 26A which is longitudinally-extending. Positioning member 26 in this non-limiting example includes one or more and in this example a plurality of longitudinally spaced-apart stops or backstops or backing plates 26B which are coupled to the beam and perpendicular to outfeed axis 58. Alternatively, the positioning member as a whole may be referred to as a backstop. Backing plates 26B are configured to abut and extend flush along distal side 27B of first board 24A seen in FIG. 1. Backing plates 26B may optionally comprise one or more gripping elements (e.g. one or more serrations and/or teeth) that abut with and promote frictional and/or mechanical engagement with the distal side of the first board; however, this is not strictly required. Positioning member 26 is thus shaped abut a respective side of first board 24A. The positioning member may thus be referred to as an outfeed positioning member or outfeed stop against which distal side 27B of first board 24A abuts.

Figures 5, 5A:
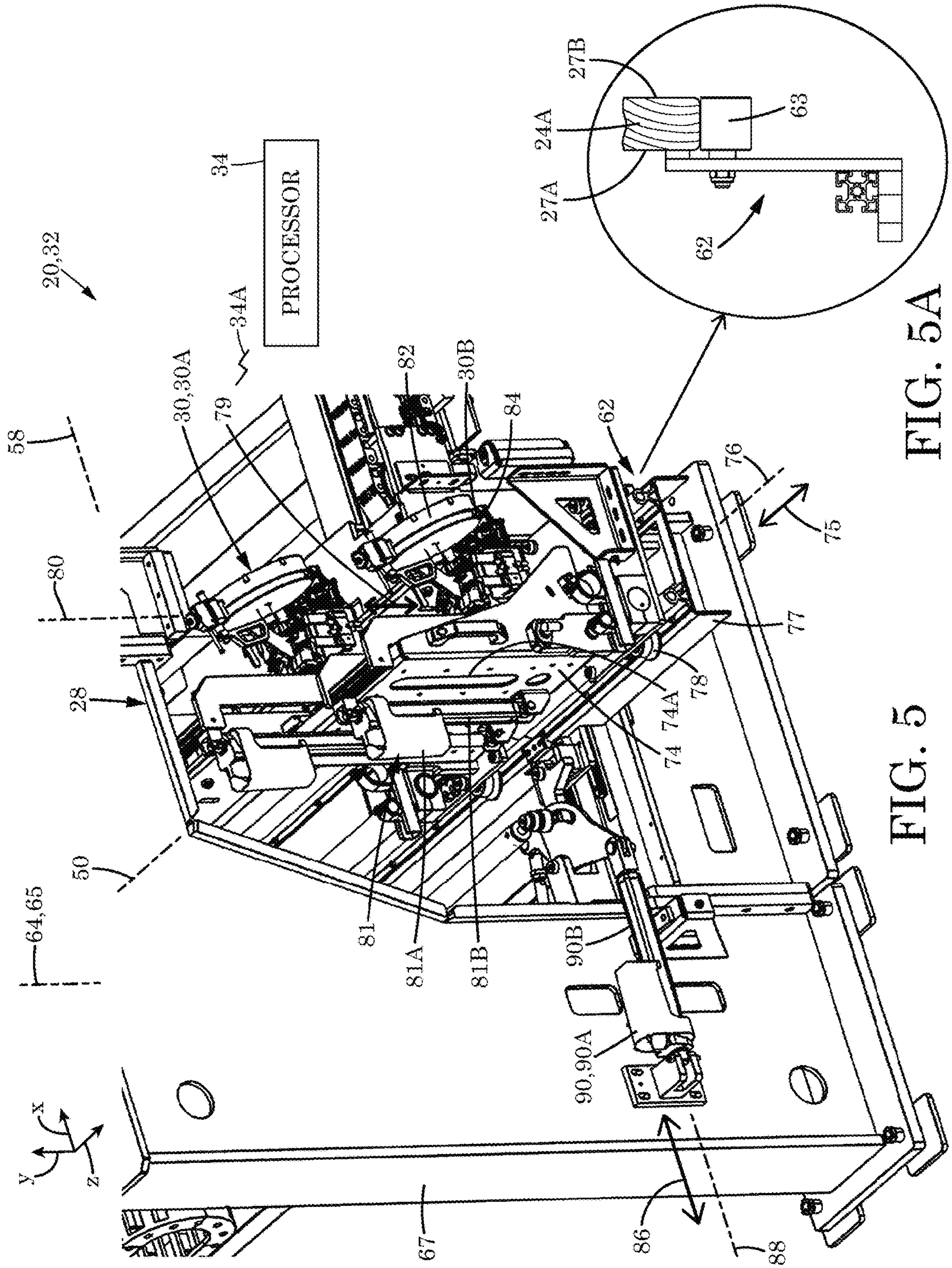
FIG. 5 is a right side, top, rear perspective view of the NLT machine of FIG. 4, illustrating a datum rail, a nail gun carriage with nail guns coupled thereto, and an automatic retractor operatively connected to the nail gun carriage, with the rest of the NLT machine shown in fragment.
FIG. 5A is an enlarged side elevation view of the datum rail thereof, together with the first board of FIG. 1 being received thereon, with the first board being shown in fragment.

As seen in FIG. 5A, NLT machine 20 includes an elongate pathway or track, in this example a rail, in this case a datum rail 62. The datum rail extends parallel to longitudinal axis 50 of the NLT machine. Datum rail 62 is configured to extend along proximal side 27A of respective boards 24A as they are infeed into press 28. The board is configured to be moveable along or parallel to longitudinal axis 50 of NLT machine 20 via a plurality of longitudinally spaced-apart rollers 63 rotatably coupled to the datum rail. The datum rail is configured to determine or set a zero point or known zero position for indexing of positioning member 26 seen in FIG. 4, with the final distance therebetween corresponding to the overall width $W_1$ of panel 22 seen in FIG. 3.

Referring back to FIG. 4, NLT machine 20 includes a framing 67 with a proximal end 67A and distal end 67B, and an actuator, in this example a pneumatic cylinder 69 coupled to or near the proximal end of the framing. The NLT machine includes an end stop or end stop member 71 that is servo-controlled so as to be moveable along longitudinal axis 50 thereof between ends 67A and 67B of framing 67 based on the desired overall length L1 of panel 22 seen in FIG. 3. The end stop member may thus be referred to as a mobile end stop or mobile end stop member. Each board is biased against the end stop member 71 via cylinder 69 which receives feedback from an encoder. This allows for constant length confirmation of the boards entering NLT machine 20. If cylinder 69 (or rod thereof) travels too far or past a predetermined threshold, the NLT machine is configured to stop and notify the operator that there is an issue. End stop member 71 is pinned in its final location for extra rigidity according to one non-limiting embodiment. Pin locations are may be at predetermined intervals such as 10" apart in one non-limiting example, and once the length has exceeded the predetermined interval or e.g. 10" tolerance, the end stop member moves into a new location depending on the required length L1 of panel 22 seen in FIG. 3.

Processor 34 seen in FIG. 4 is configured to index positioning member 26 based on desired dimensions (e.g. length $L_1$ and width $W_1$ seen in FIG. 3) of panel 22. In addition and/or optionally, the positioning member may operatively connect to conveyor 51 seen in FIG. 4 and with endless belts 52 thereof being configured to index positioning member 26 along and/or substantially parallel to outfeed axis 58 and/or outfeed plane 59. As a further alternative, the conveyor may not comprise actuator 51A and, rather, couple to positioning member 26, with actuation of the positioning member via ball screws 54 causing the endless belts to also incrementally rotate.

Referring to FIG. 1, positioning member 26 in its initial position is spaced-apart from datum rail 62 to provide space therebetween to receive first board 24A. Positioning of positioning member 26 is incrementally adjustable thereafter (as shown by arrow 60) via processor 34 in outfeed direction 56 to both receive second board 24B adjacent the first board and to customize the size or spanning distance $D_1$ of gap 31 between the first and second boards corresponding to and/or taking into account at least in part the inputted desired dimensions, such as overall length $L_1$ and width $W_1$ of panel 22 seen in FIG. 3. The positioning member is thus indexable along and/or parallel to outfeed axis 58, configured to abut with first board 24A and thereafter configured to adjust and/or customize the size or spanning distance $D_1$ of gap 31 between the first board and second board 24B. Positioning member 26 indexes horizontally for each incoming board in this example. Referring to FIG. 1, the indexing distance $D_3$ is equal to the measured board thickness $T_2$ plus the desired gap or spanning distance $D_1$ between each of adjacent boards 24A and 24B. Positioning member 26 thus augments back based on the lamination or board thickness entering and the programmable gap.

According to one aspect, processor 34 is configured incrementally move/position or index of positioning member 26 based also at least in part on moisture content of boards 24A and 24B, as estimated or as measured/determined via wood moisture meter/sensor 42 or weather API 41 seen in FIG. 2, for example. The processor is thus configured in this embodiment to adjust positioning of positioning member 26 seen in FIG. 1 and/or customize the size or spanning distance $D_1$ of each and/or select gaps 31 between adjacent boards 24A and 24B based at least in part on the moisture content of the first and second boards so measured (via wood moisture meter/sensor 42 seen in FIG. 2), determined, estimated and/or inputted.

According to another non-limiting embodiment, processor 34 is configured incrementally move/position or index of the positioning member based at least in part on the actual or instantaneous dimensions of first board 24A and second board 24B, such as thickness $T_2$ thereof. The processor is thus configured in this embodiment to adjust positioning of positioning member 26 and/or thus customize the size or spanning distance $D_1$ of each and/or select gaps 31 based at least in part on the dimensions of adjacent boards 24A and 24B so measured or determined in real-time via measuring device/unit 46 seen in FIG. 2, for example. The dimensions of the boards are thus measured in real-time prior to positioning of the positioning member being incrementally adjusted via the processor in one non-limiting embodiment.

Processor 34 is thus configured to receive data and/or a signal indicative of a moisture content of boards 24A and 24B, data and/or a signal indicative one or more dimensions of the boards, and/or data and/or a signal one or more desired overall dimensions of panel 22, and actuate positioning member 26 to control the size or spanning distance $D_1$ of gap 31 based on said data and/or signals. The processor is thus configured to: receive signals indicating a characteristic comprising one or more of moisture content of the first and second board, one or more dimensions of the first and/or second boards, or one or more desired overall dimensions of the panel; determine and/or compute the size or distance of the gap based on at least the characteristic; and actuate the positioning member to control the size of the gap based on the characteristic. Positioning member 26 is thus indexed to control, customize and/or adjust the size or spanning distance $D_1$ of gap 31 between adjacent boards 24A and 24B in real-time based on the desired dimensions of the panel, and one or more of real-time moisture content or actual dimensions of the boards. The size of the gap is thus determined according to one aspect based on overall desired dimensions of the panel and one or more of i) actual or instantaneous dimensions of the first and second boards; and ii) actual or instantaneous moisture content of the first and second boards.

Still referring to FIG. 1, processor 34 is configured according to one non-limiting embodiment to emit a notification or alarm when the characteristic exceeds a configurable and/or predetermined threshold e.g. a wood moisture content that is too high or a given board 24 that is too long, thick and/or wide.

As seen in FIG. 4, press 28 is movable substantially along and/or parallel a press axis 64 and plane 65. The press axis and plane extend vertically in this non-limiting embodiment and may thus be referred to as a vertical axis and plane; however, this orientation is not strictly required. Press axis 64 and plane 65 are generally or substantially perpendicular to outfeed axis 58 and plane 59.

Press 28 comprises at least one and in this example a plurality of longitudinally spaced-apart biasing members, in this non-limiting example actuators, in this non-limiting case pneumatic cylinders 66A, 66B, . . . 66N. The pneumatic cylinders couple to framing 67 of NLT machine 20 so as to remain stationary relative thereto. For each pneumatic cylinder 66, injection of compressed air therein causes a rod 68A thereof to selectively extend outwards therefrom to bias the rod downwards to abut against first board 24A and second board 24B as seen in FIG. 1. The pneumatic cylinders may be referred to as clamping members, clamping cylinders or press rams and rods 68A may be referred to as press heads. Each rod may include a planar member or plate 68B coupled to a distal end thereof. Press 28 includes a press bed 70 which is longitudinally extending and which aligns with pneumatic cylinders 66. Lower ends 25B of first and second boards 24A and 24B are configured to operatively connect to, abut and/or extend along the press bed. Pneumatic cylinder 66, when actuated via injection of hydraulic fluid, is configured to selectively apply a biasing or in this case downward force 72A against upper ends 25A of the first and second boards so positioned in place via positioning member 26 and processor 34 so as to selectively bias the boards against press bed 70 and fix in place of the boards so positioned. Actuation of press 28 thus promotes fixing in place of the size or spanning distance $D_1$ of gap 31 between the boards.

Press 28 is configured to selectively bias against only adjacent boards 24A and 24B of the plurality of boards which form panel 22 seen in FIG. 3. The press is thus configured to selectively bias against thinner ends 25A of the adjacent boards seen in FIG. 1. Press 28 is therefore configured to only bias against the thinner ends of boards 24A and 24B in this example. Pneumatic cylinders 66 are thus configured to only provide pressure to the new board 24B and the last nailed board 24A. Boards 24A and 24B are not tight against each other because there is no pressure from press 28 being applied to positioning member 26. The press is configured to fix positioning of first board 24A and second board 24B at least relative to outfeed axis 58 and/or outfeed plane 59. The second board is thus pressed down vertically by rods 68A seen in FIG. 4 to align flat with the adjacent first board against the press bed. Press 28 is configured to apply sufficient clamping pressure to ends 25A and 25B of boards 24A and 24B seen in FIG. 1 so as to inhibit bowing of the boards within a predetermined threshold.

The boards so positioned and fixed in place are now ready to be nailed together. Nail guns, including their various parts and functionings, are known per se and the following is a description of a non-limiting embodiment. As seen in FIG. 5, NLT machine 20 includes at least one and in this example a plurality of longitudinally spaced-apart nail guns 30A and 30B. Each nail gun may be referred to and/or comprise as a nailer. Nail guns 30 couple to carriages 74 that are configured to translate as shown by arrow 75 along a first orthogonal axis 76, which in this case is longitudinally along and/or parallel to longitudinal axis 50. The nail guns translate along the first orthogonal axis via a pathway, in this non-limiting example a longitudinally-extending rail 77 to which the carriages couple via rollers 78. This enables nail guns to travel along the length $L_2$ of boards 24A seen in FIG. 3.

Referring to FIG. 5, nail guns 30 are also moveable as shown by arrow 79 along a second orthogonal axis 80 parallel to press axis 64, in this example between upper and lower ends 25A and 25B of boards 24B from a first or lower position shown by nail gun 30B in FIG. 5, to a second or upper position shown by nail gun 30A. In this example the nail guns are movable between these positions via pathways 74A formed by carriage 74 together with respective actuators 81 operatively connected thereto and configured to enable the nail guns to selectively move along the pathways. In this non-limiting embodiment each actuator includes a cylinder 81A coupled to the carriage and a piston 81B coupled to nail gun 30B, with removal or insertion of hydraulic fluid into the cylinder causing the piston and thus the nail gun to retract or extend relative to the carriage. Still referring to FIG. 5, each nail gun includes a storage housing 82 via which nails are stored and a nozzle 84 through nails 23 are selectively hammered into boards 24B as seen in FIG. 1.

Referring back to FIG. 5, nail guns 30 are moveable as shown by arrow 86 along a third orthogonal axis 88, which extends parallel to outfeed axis 58. The nail guns are moveable along the third orthogonal axis in this non-limiting embodiment via actuators, in this example linear actuators, in this case automatic retractors 90. Each retractor includes a cylinder 90A coupled to framing 67 of NLT machine 20 and a piston 90B operatively connected to carriages 74 so as to translate the nail guns substantially or generally along or parallel to axis 88. Each retractor 90 is configured to allow for different board thicknesses. Each retractor is configured to adjust the position of the nail carriage algorithm to determine widths and pressures. Nail guns 30 in this non-limiting embodiment are thus configured to move via linear actuator 81 up and down in the Y direction while nail carriages 74 are configured to move along X and Z directions.

Nail guns 30 so moveable with such multiple degrees of freedom, enables panel 22 to be coupled together via customized nail patterns 36 seen in FIG. 3. Referring to FIG. 1, the nail guns are configured to insert nails 23 into proximal sides 27A of boards 24B seen in FIG. 1. Positioning member 26 is configured to resist a force applied by the one or more nail guns to boards 24A and 24B. The positioning member is configured/shaped to thus be sufficiently rigid to resist the horizontal forces induced by the nail guns and/or carriages 74 seen in FIG. 5. Thus, press 28 does not push against positioning member 26. The press is configured to move independent of the nail guns 30, and vice versa.

In summary and according to one aspect, the nailing carriages engage, with in this non-limiting embodiment six nailing carriages moving lengthwise along press 28, with each carriage in one non-limiting example covering 10 ft of the press bed length. As seen in FIG. 5, there are two nail guns 30 per carriage 74 in this non-limiting embodiment. The nail guns are configured to move vertically on the carriage via actuators 81 to adjust to the required nailing pattern required by the design. As carriages 74 travel along the length of the panel, longitudinally spaced-apart rollers 83 seen in FIG. 1 are configured to bias board 24B adjacent thereto horizontally against the adjacent (and/or previously nailed) board 24A. Nails 23 are in this example next fired from nail guns at a relatively rapid pace to secure board 24B against adjacent board 24A according to the programed nailing pattern. According to one non-limiting embodiment, nailing pattern 36 seen in FIG. 3 may incorporate a longitudinal/horizontal offset with nails extending through even-numbered boards being offset from nails extending through odd-numbered boards (e.g. even-numbered boards having a 4" offset and odd-numbered boards having a 8" offset according to one non-limiting example.

According to one non-limiting embodiment, the height or width $W_2$ of board 24A seen in FIG. 1 is measured, and nailing pattern are programmed based thereon in the initial parameters. According to one non-limiting embodiment, NLT machine 20 as herein described is configured to provide: one row of nails for a panel comprising 2×4 boards; two rows of nails for a panel comprising 2×8 boards; three rows of nails for a panel comprising 2×10 boards; and three or four rows of nails for a panel comprising 2×12 boards. However, this is not strictly required and other nail arrangements/patterns may be provided in other embodiments.

As mentioned above, nail guns per se, including their various parts and functionings, are known per se, and nail guns will accordingly not be described in further detail.

Referring back to FIG. 1, press 28 is configured to release first and second boards 24A and 24B subsequent to nail guns 30 nailing together the first and second boards. This occurs in this non-limiting embodiment by removing hydraulic from cylinders 66A seen in FIG. 4, which causes corresponding rods 68A to retract and dislodge from the boards as shown by arrow 72B seen in FIG. 1. NLT machine 20 is configured to enable movement of boards 24A and 24B seen in FIG. 1 along or parallel to outfeed axis 58 when press 28 (and/or its plurality of actuators thereof) is in the retracted position. The above positioning of adjacent boards via positioning member 26 and processor 34 to adjust/customize spanning distance $D_1$ of gap 31, biasing together of adjacent boards so positioned via the press, and then nailing together adjacent boards so positioned via nail gun 30, is then repeated as needed until panel 22 seen in FIG. 3 is fully manufactured. Pneumatic cylinders 66 seen in FIG. 4 are evenly spaced along longitudinal axis 50 of NLT machine 20 to ensure adequate flat pressure along the laminations or boards so as to limit the amount of post processing work required.

Referring back to FIG. 6, positioning member 26 is configured to selectively disengage and move clear of the panel once fully-manufactured/complete. The following is a non-limiting embodiment which achieves this functionality. NLT machine outfeed unit 20B in this example includes a pair of longitudinally spaced-apart and laterally-extending arms 26C and 26D to which opposite ends of beam 26A couple and which are pivotal relative thereto. The arms are pivotal about a longitudinal axis 26E and elongate member or shaft 26F seen in FIG. 4. The longitudinal axis extends parallel to beam 26A and longitudinal axis 50 of NLT machine 20 in this example and perpendicular to outfeed axis 58. Referring back to FIG. 6, NLT machine outfeed unit 20B includes one or more and in this example a pair of longitudinally spaced-apart counterweights 26G and 26H coupling to ends of the arms opposite beam 26A. When manufacturing of the panel is completed, positioning member 26 is configured to rotate upwards about axis 26E as shown by arrow 94 and/or out of the outfeed plane 59. The panel may then be removed for finishing fabrication stages if desired/applicable (e.g. painting and the like).

In summary and referring to FIG. 1, NLT machine 20 is thus configured according to one embodiment to receive an individual board 24B and confirm the length and dimensions thereof thereafter or during the process thereof. The board is then pressed vertically down by pneumatic cylinders 66. Nail carriages 74 push board 24B horizontally against the previous board 24A, which is resisted by positioning member 26, with nail guns 30 nailing together the boards thereafter. The positioning member next indexes the desired distance $D_3$ to allow the next board to feed into press 28. Once all boards are complete and nailed, positioning member 26 is moved clear of the panel and the panel is ready to be removed.

Figure 7A:
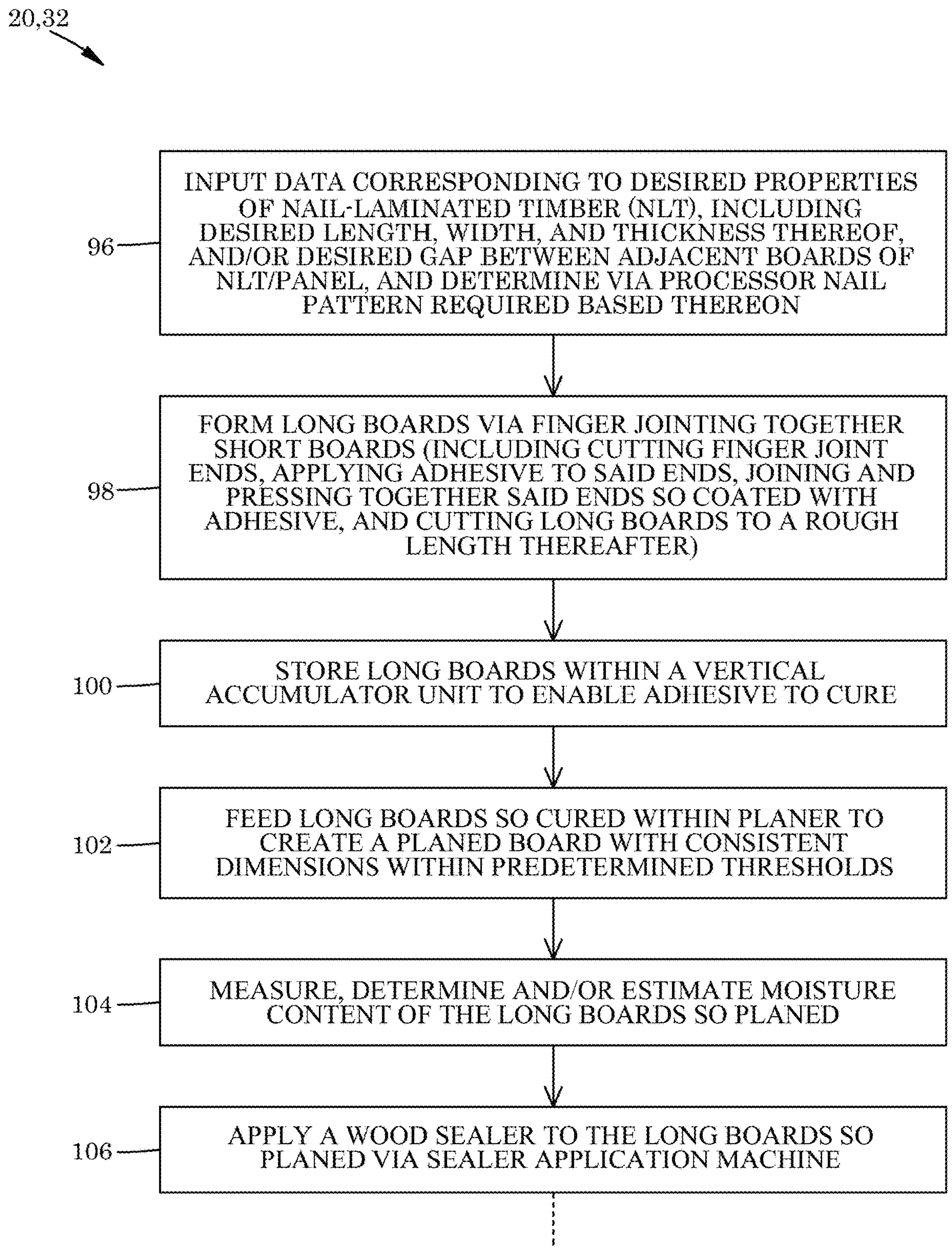
FIGS. 7A and 7B comprise a flow chart of a method of automating manufacture of NLT via the NLT manufacturing line and assembly of FIG. 2.

There is accordingly provided a method of manufacturing nail-laminated timber (NLT) or panel 22 seen in FIG. 3. Referring to FIG. 7A and as shown by box 96, the method may include first inputting data corresponding to desired properties of the panel, such as desired length, width and/or thickness thereof and/or desired gap size ranges between adjacent boards, with the processor optionally determined a required nail pattern based thereon. The method may next include finger-jointing together a plurality of shorter said boards to form longer said boards, as shown by box 98. This step may comprising cutting finger joint ends, applying adhesive to said ends, joining and pressing together said ends so coated with adhesive, and cutting long boards to an approximate or rough length thereafter. The method may next include storing the long boards so finger-jointed together within a vertical accumulator unit to enable/facilitate curing of the adhesive as shown by box 100.

The method may include planing the long boards to create planed boards in the form of dimensioned lumber and/or so as to form said first and second boards, as shown by box 102. This planing step may include using a wood planing machine to create planed boards with consistent dimensions within predetermined thresholds.

The method may next include estimating, determining, and/or inputting the moisture content of the planed boards as shown by box 104. This step may include measuring the moisture content of the planed boards via a moisture sensor and/or wood moisture meter.

The method may next include coating the boards so planed with a wood sealer via a sealer application machine, as seen by box 106.

Figure 7B:
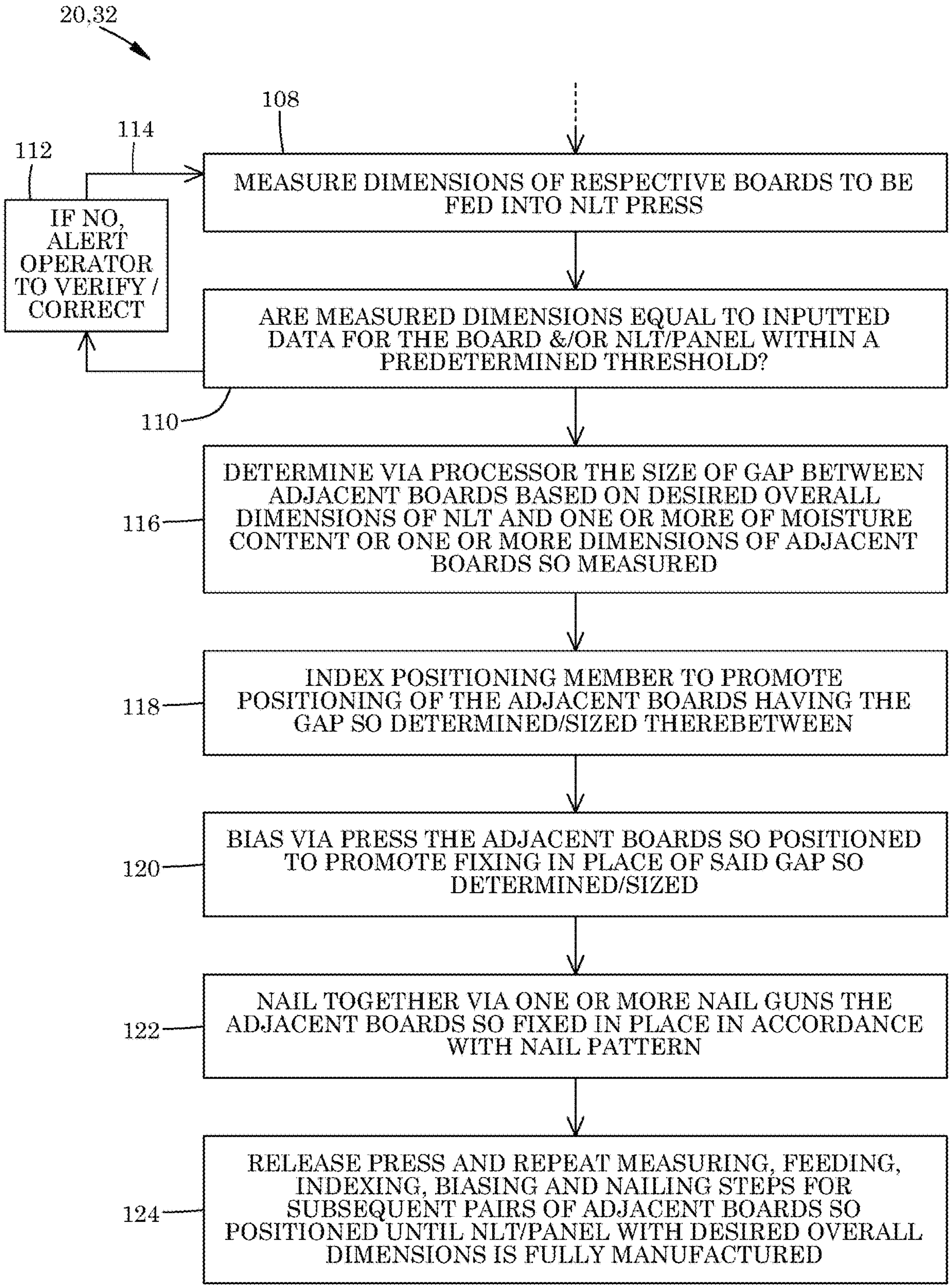

Referring now to FIG. 7B, the method next include measuring actual and/or instantaneous dimensions of the boards so planed in real-time prior to being fed into the NLT press, as shown by box 108. The method may next (or as part of this step) include determining via the processor whether the measured dimensions are equal to inputted data for the board and/or panel within a predetermined threshold, as shown by box 110. If the answer is no, then the method may include emitting a notification or alarm when the characteristic exceeds a configurable and/or predetermined threshold, as shown by box 112. In this case, the cycle may thereafter be repeated as shown by arrow 114 with measuring of new, corrected and/or re-planed boards being measured as anew.

The method next includes determining via the processor the size or spanning distance of the gap between adjacent boards based on desired overall dimensions of the panel and one or more of moisture content or one or more dimensions of the adjacent boards so measured, as seen by box 116. The method may thus include receiving one or more signals indicating a characteristic, wherein the characteristic is one or more of: one or more dimensions of the first and/or second boards, moisture content of the first and/or second boards, or one or more desired overall dimensions of the panel; and determining the size of the gap via the processor based at least in part on said characteristic.

The method includes next indexing the positioning member via the processor to control, customize and/or adjust a size of a gap between adjacent said boards in real-time towards the determined and/or target gap, as shown by box 118. Within this step, the method may include abutting positioning member 26 seen in FIG. 1 with first board 24A, and indexing the positioning member substantially along or parallel to outfeed axis 58 so as to customize the size or spanning distance $D_1$ of gap 31 between the first board and adjacent second board 24B via adjustment of the positioning of the positioning member. The method includes within the indexing step, selecting adjusting positioning of the positioning member via one or more actuators, in this example one or more linear actuators, in this case one or more ball screws 54A, 54B, 54C and 54D seen in FIG. 4. The method may include within the indexing step, indexing the positioning member via NLT machine outfeed unit 20B comprising one or more endless belts 52A, 52B, 52C, 52D, 52E and 52F moveable substantially along or parallel to outfeed axis 58 and/or outfeed plane 59, with positioning member 26 coupling to the one or more endless belts.

Referring back to FIG. 7B, the method includes next biasing in place the first and second boards so positioned, in this example via a press, so as to promote fixing in place of said gap so determined/sized, as shown by box 120. Within this step, the method may include biasing against only the thinner or upper ends 25A of first and second boards 24A and 24B seen in FIG. 1. Within this step and referring to FIG. 4, the method includes biasing in place the first and second boards via a plurality of longitudinally spaced-apart actuators or cylinders 66 moveable generally or substantially along or parallel to press axis 64 which is generally or substantially perpendicular to a plane defined by the panel and/or outfeed axis 58.

Referring back to FIG. 7B, the method next includes nailing together the boards so positioned and fixed in place in accordance, as shown by box 122. Within this step, this may include nailing in accordance with a given, determined and/or desired nail pattern. Within this step, this may include applying a nailing force to at least first board 24A seen in FIG. 1 by nailing together first and second boards 24A and 24B and configuring positioning member 26 to be able to resist this nailing force.

As seen in FIG. 7B, the method next includes releasing the press, and repeating the measuring, feeding, indexing, biasing and nailing steps described above for subsequent pairs of adjacent boards so positioned until a panel with desired overall dimensions is fully manufactured, as shown by box 124. Within this step, the method may include enabling movement of first and second boards 24A and 24B seen in FIG. 1 generally or substantially along or parallel to outfeed axis 58 when press 28 (and/or the plurality of actuators thereof) are in retracted positions.

Many advantages result from the structure of the present invention. NLT manufacturing assembly 32 as herein described may thus enable automated production of fully finger jointed, mass produced, NLT mass timber panel 22, for example.

It will also be appreciated that many variations are possible within the scope of the invention described herein.

Where a component (e.g. a software module, processor, assembly, device, circuit, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, code for configuring a configurable logic circuit, applications, apps, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Software and other modules may reside on servers, workstations, personal computers, tablet computers, and other devices suitable for the purposes described herein.

Interpretation of Terms

Unless the context clearly requires otherwise, throughout the description and the claims:

- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms. These terms ("a", "an", and "the") mean one or more unless stated otherwise;
- "and/or" is used to indicate one or both stated cases may occur, for example A and/or B includes both (A and B) and (A or B);
- "approximately" when applied to a numerical value means the numerical value±10%;
- where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and
- "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by “about”. In this context, “about” provides literal support for the exact numerical value that it precedes, the exact numerical value±5%, as well as all other numerical values that are near to or approximately equal to that numerical value. Unless otherwise indicated a particular numerical value is included in “about” a specifically recited numerical value where the particular numerical value provides the substantial equivalent of the specifically recited numerical value in the context in which the specifically recited numerical value is presented. For example, a statement that something has the numerical value of “about 10” is to be interpreted as: the set of statements:

in some embodiments the numerical value is 10;

in some embodiments the numerical value is in the range of 9.5 to 10.5;

and if from the context the person of ordinary skill in the art would understand that values within a certain range are substantially equivalent to 10 because the values with the range would be understood to provide substantially the same result as the value 10 then “about 10” also includes:

in some embodiments the numerical value is in the range of C to D where C and D are respectively lower and upper endpoints of the range that encompasses all of those values that provide a substantial equivalent to the value 10

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternatives or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in “some embodiments”. Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that “some embodiments” possess feature A and “some embodiments” possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

Additional Description

Examples of apparatus or machines for automating the manufacture of nail-laminated timber (NLT), as well as methods related thereto, have been described. The following clauses are offered as further description.

(1) An apparatus or machine for automating manufacture of nail-laminated timber (NLT) comprising at least first and second boards, the apparatus or machine comprising: a positioning member configured to abut with the first board, with positioning of the positioning member being incrementally adjustable in an outfeed direction to both receive a second board adjacent the first board and customize a size of a gap between said first and second boards corresponding to desired dimensions of the NLT; and a nail gun configured to nail together the first and second boards thereafter.

(2) An apparatus or machine according to clause 1 or any clause herein, including a processor to which desired dimensions of the NLT are inputted, with positioning of the positioning member being incrementally adjustable thereafter via the processor in said outfeed direction to both receive the second board adjacent the first board and customize the size of the gap between said first and second boards corresponding to said desired dimensions.

(3) An apparatus or machine according to any clause herein, including a processor, wherein the positioning member is indexed via the processor based on desired dimensions of the NLT.

(4) An apparatus or machine according to any clause herein, wherein positioning of the positioning member is based at least in part on moisture content of the first and second boards.

(5) An apparatus or machine according to any clause herein, including a moisture and/or humidity sensor configured to determine instantaneous moisture content of the first and second boards and/or moisture content of the first and second boards in real-time.

(6) An apparatus or machine according to any clause herein, including a weather application programming interface (API) integrated to obtain relative humidity level data or information in real-time from which wood moisture of the first and second boards is determined and/or estimated.

(7) An apparatus or machine according to any clause herein, wherein the processor adjusts positioning of the positioning member and/or customizes the size of said gap based at least in part on the moisture content of the first and second boards so measured and/or determined.

(8) An apparatus or machine according to any clause herein, wherein the dimensions of the first and second boards are measured in real-time prior to positioning of the positioning member being incrementally adjusted.

(9) An apparatus or machine according to any clause herein, wherein dimensions of the first and second boards are measured in real-time during or prior to infeeding, with positioning of the positioning member being based at least in part on the dimensions of the first and second boards so measured in real-time.

(10) An apparatus or machine according to any clause herein, including a measuring machine or device to measure the dimensions of the first and second boards in real-time prior to being nailed together.

(11) An apparatus or machine according to any clause herein, wherein the processor adjusts positioning of the positioning member and/or customizes the size of said gap based at least in part on the dimensions of the first and second boards so measured and/or determined in real-time.

(12) An apparatus or machine according to any clause herein, wherein the processor adjusts positioning of the positioning member and/or customizes the size of said gap based at least in part on actual or instantaneous dimensions of the first and second boards.

(13) An apparatus or machine according to any clause herein, wherein each said board comprises dimensioned lumber and/or is a part of a respective layer of dimensioned lumber.

(14) An apparatus or machine for automating manufacture of nail-laminated timber (NLT), the NLT comprising a plurality of fastened-together layers of dimensioned lumber, the apparatus or machine comprising: a positioning member indexable along a first axis and configured to abut with a first layer of dimensioned lumber in the NLT; one or more nail guns configured to nail together the first layer and an adjacent second layer of dimensioned lumber in the NLT; wherein the positioning member is configured to adjust and/or customize the size of the gap between the first and second layer.

(15) An apparatus or machine according to any clause herein, wherein the first and second boards are moveable substantially parallel to a first or outfeed axis and/or along an outfeed direction and/or laterally outwards.

(16) An apparatus or machine according to any clause herein, wherein the positioning member is shaped abut the width of the first board.

(17) An apparatus or machine according to any clause herein, wherein each said board has a pair of laterally-extending sides and a pair of laterally-extending ends extending between the sides thereof, and wherein the positioning member is shaped abut a respective said side of the first board.

(18) An apparatus or machine according to any clause herein, including a press movable along a second or press axis to selectively bias against the first and second boards, wherein the second or press axis is generally or substantially perpendicular to the first or outfeed axis and/or outfeed direction.

(19) An apparatus or machine according to any clause herein, wherein the press is configured to move independent of the nail gun, and vice versa.

(20) An apparatus or machine according to any clause herein, wherein the press is configured to selectively apply sufficient clamping pressure to the boards so as to inhibit bowing of the boards within a predetermined threshold.

(21) An apparatus or machine according to any clause herein, including a press configured to selectively bias against respective said ends the first and second boards.

(22) An apparatus or machine according to any clause herein, wherein the press comprises a plurality of longitudinally spaced-apart biasing members that abut against the first and second boards.

(23) An apparatus or machine according to any clause herein, wherein the press is configured to release the first and second boards subsequent to the nail gun nailing together the first and second boards thereafter.

(24) An apparatus or machine according to any clause herein, wherein the nail guns are coupled to carriages that are configured to translate along a third or longitudinal axis which is generally or substantially perpendicular to the first or outfeed axis and/or outfeed plane.

(25) An apparatus or machine according to any clause herein, wherein the nail guns are coupled to retractors on the carriages that are configured to translate the nail guns along the first or outfeed axis and/or outfeed plane.

(26) An apparatus or machine according to any clause herein, including one or more automatic retractors configured to accommodate panels comprising different thicknesses (or boards thereof collectively having different thicknesses).

(27) An apparatus or machine according to any clause herein, including one or more automatic retractors configured to adjust the position of the nail carriage algorithm to determine widths and pressures.

(28) An apparatus or machine according to any clause herein, wherein the positioning member comprises a gripping element that abuts with a distal side of the first layer, wherein the gripping element comprises one or more serrations and/or teeth.

(29) An apparatus or machine according to any clause herein, wherein the positioning member is configured to resist a force applied by the one or more nail guns to the first layer.

(30) An apparatus or machine according to any clause herein, including a controller configured to: receive signals indicating a characteristic, wherein the characteristic is one or more of moisture content of the first and second board, one or more dimensions of the first and/or second boards, or one or more desired overall dimensions of the NLT; determine a size of the gap based on at least the characteristic; and actuate the positioning member to control the size of the gap based on said characteristic.

(31) An apparatus or machine according to any clause herein, including a controller configured to: receive signals indicating a characteristic, wherein the characteristic is two or more of moisture content of the first and second board, one or more dimensions of the first and/or second boards, or one or more desired overall dimensions of the NLT; and actuate the positioning member to control a size of the gap based on said characteristic.

(32) An apparatus or machine according to any clause herein, including a controller configured to: receive data indicative of moisture content of the first and second board, one or more dimensions of the first and/or second boards, or one or more desired overall dimensions of the NLT; and actuate the positioning member to control a size of the gap based on said data.

(33) An apparatus or machine according to any clause herein, wherein the controller computes the size of the gap based on at least the data or the characteristic.

(34) An apparatus or machine according to any clause herein, wherein the controller is configured to emit a notification or alarm when the characteristic exceeds a configurable and/or predetermined threshold.

(35) An apparatus or machine according to any clause herein, including an outfeed unit configured to support the NLT, the outfeed unit including one or more endless belts that abut with the NLT, the one or more endless belts being configured to index the NLT along the first or outfeed axis and/or outfeed plane, and the positioning member coupling to the one or more endless belts.

(36) An apparatus or machine according to any clause herein, including a linear actuator via which the positioning member is actuatable along the first or outfeed axis and/or outfeed plane.

(37) An apparatus or machine according to any clause herein, wherein the linear actuator is a ball screw.

(38) A nail-laminated timber (NLT) machine or apparatus comprising: a press; an infeed via which first and second boards are received in the press; a positioning member configured to customize and/or adjust a size of a gap between the first and second boards, with actuation of the press promoting fixing in place of the size of said gap thereafter; and a nail gun configured to nail together the first and second boards so fixed in place.

(39) A machine or apparatus according to any clause herein, wherein the size of the gap is determined based on overall desired dimensions of the NLT and actual or instantaneous dimensions of the first and second boards.

(40) A machine or apparatus according to any clause herein, wherein the size of said gap is determined based on overall desired dimensions of the NLT and actual or instantaneous moisture content of the first and second boards.

(41) A nail-laminated timber (NLT) machine or apparatus comprising: a processor via which desired dimensions of the NLT are inputted; a positioning member indexed to control, customize and/or adjust a size of a gap between adjacent boards in real-time based on said desired dimensions of the NLT and one or more of real-time moisture content or actual dimensions of the boards; a press via which said adjacent boards so positioned are held in place; and a nail gun configured to nail together the adjacent boards so held in place.

(42) A machine or apparatus according to any clause herein, including a finger-jointing unit via which a plurality of shorter said boards are finger jointed together to form longer said boards which are subsequently fed into the press.

(43) A machine or apparatus according to any clause herein, including a wood planing machine downstream of the finger-jointing unit and via which the longer said boards are planed to create planed said boards in the form of dimensioned lumber.

(44) A machine or apparatus according to any clause herein, including a wood coating unit downstream of the finger-jointing unit and/or wood planing machine and via which the planed said boards are coated with a wood sealer.

(45) A machine or apparatus according to any clause herein, including a measuring device or unit downstream of the wood coating unit and/or wood planing machine and via which actual and/or instantaneous dimensions of the dimensioned lumber is measured in real-time.

(46) An apparatus or machine according to any clause herein, wherein the positioning member is an outfeed stop.

(47) A nail-laminated timber (NLT) machine or apparatus comprising: a positioning member configured to customize and/or adjust a size of a gap between the first and second boards; a press actuation of which promotes fixing in place of the first and second boards so positioned; and a nail gun configured to nail together the first and second boards so pressed in place.

(48) An apparatus or machine for manufacturing nail-laminated timber (NLT), the apparatus or machine comprising: a press moveable along a first or press axis, the press comprising a plurality of longitudinally spaced-apart biasing members configured to selectively bias first and second boards; and one or more nail guns configured to nail together the first and second boards so biased; wherein the press axis is generally or substantially perpendicular to a plane defined by the NLT and/or an outfeed axis and/or outfeed plane.

(49) An apparatus or machine according to any clause herein, wherein the NLT comprises a plurality of said boards so nailed together and wherein the press is configured to selectively bias against only adjacent pairs of said plurality of boards.

(50) An apparatus or machine according to any clause herein, wherein the press is configured to selectively bias against thinner ends of the first and second boards and wherein the one or more nail guns are configured to insert nails into thicker ends of the first and second boards.

(51) An apparatus or machine according to any clause herein, including an outfeed stop against which the thicker end of the first board abuts and including an endless belt coupled to the outfeed stop, with the endless belt being selectively rotatable to move the first board downstream so as to receive the second board.

(52) An apparatus or machine according to any clause herein, wherein the press is configured to fix positioning of the first and second boards.

(53) An apparatus or machine according to any clause herein, wherein the press is configured to fix positioning of the first and second boards in a direction substantially perpendicular to the outfeed axis and/or outfeed plane.

(54) An apparatus or machine according to any clause herein, wherein the press is configured to fix positioning of the first and second boards relative to the outfeed axis and/or outfeed plane.

(55) An apparatus or machine according to any clause herein, wherein the press is configured to only bias against the thinner ends of the first and second boards.

(56) An apparatus or machine according to any clause herein, wherein the apparatus or machine is configured to enable movement of the first and/or second boards along the outfeed axis and/or outfeed plane and/or outfeed direction when the press and/or plurality of biasing members thereof are in the retracted positions.

(57) An apparatus or machine according to any clause herein, wherein the press comprises one or more press heads that selectively abut with the first and second boards.

(58) An apparatus or machine for automating manufacture of nail-laminated timber (NLT), the NLT comprising a plurality of fastened-together layers of dimensioned lumber, the apparatus or machine comprising: a press moveable along a first axis to selectively bias against first and second said layers of dimensioned lumber; one or more nail guns configured to nail together the first and second said layers of dimensioned lumber so biased; an outfeed positioning member indexable along a second axis generally or substantially perpendicular to the first axis to create a space to permit the press to receive a third said layer of dimensioned lumber for pressing with the second said layer of dimensioned lumber, with the one or more nail guns thereafter nailing together the third and second said layers of dimensioned lumber, wherein the positioning member so indexed is configured to adjust and/or customize a gap between adjacent said layers of dimensioned lumber in real-time.

(59) An apparatus or machine according to any clause herein, wherein the NLT comprise said boards so nailed together.

(60) An apparatus or machine according to any clause herein, wherein the NLT comprise a mass timber panel.

(61) An apparatus or machine according to any clause herein, including an end stop configured to be selectively moveable along a longitudinal axis of the apparatus or machine based on a desired overall length of the NLT or panel.

(62) An apparatus or machine according to any clause herein, wherein each board of the NLT or panel is biased against the end stop via an actuator which receives feedback from an encoder, enabling constant or real-time length confirmation of the boards entering therein.

(63) An apparatus or machine according to any clause herein, wherein the positioning member is servo-controlled, is indexed and/or travels one or more known distances.

(64) A method of manufacturing nail-laminated timber (NLT), the method comprising: indexing a positioning member along a first or outfeed axis and/or outfeed plane, wherein the positioning member abuts with a first board; customizing a size of a gap between the first board and an adjacent second board via the positioning member; and nailing together the first and second boards so positioned.

(65) A method according to any clause herein, including after the customizing the gap step, biasing in place the first and second boards so positioned.

(66) A method according to any clause herein, including within the biasing step, biasing in place the first and second boards so positioned via a press.

(67) A method according to any clause herein, including within the biasing step, biasing against only the thinner ends of the first and second boards.

(68) A method according to any clause herein, including within the biasing step, biasing in place the first and second boards so positioned via a plurality of clamping members.

(69) A method according to any clause herein, including enabling movement of the first and/or second boards along the outfeed axis and/or outfeed plane when the press and/or the plurality of clamping members are in retracted positions.

(70) A method according to any clause herein, including: applying a force to at least the first board by nailing together the first and second boards; and resisting the force with the positioning member.

(71) A method according to any clause herein, including: receiving one or more signals indicating a characteristic, wherein the characteristic is one or more of: one or more dimensions of the first and/or second boards, moisture content of the first and/or second boards, or one or more desired overall dimensions of the NLT; determining the size of the gap via the controller based at least in part on said characteristic; and indexing the positioning member via the controller to control and/or adjust said size of the gap so determined.

(72) A method according to any clause herein, wherein within the customizing step, customizing and/or determining the size of the gap based on overall desired dimensions of the NLT and actual or instantaneous dimensions of the first and second boards.

(73) A method according to any clause herein, wherein within the customizing step, customizing and/or determining the size of the gap based on overall desired dimensions of the NLT and actual or instantaneous moisture content of the first and second boards.

(74) A method according to any clause herein, including: measuring the moisture content of the first and/or second boards via a moisture sensor and/or wood moisture meter; and determining the size of the gap at least in part based on said moisture content so measured.

(75) A method according to any clause herein, including: estimating, determining, and/or inputting the moisture content of the first and/or second boards; and determining the size of the gap at least in part based on said moisture content so estimated, determined and/or inputted.

(76) A method according to any clause herein, including emitting a notification or alarm when the characteristic exceeds a configurable and/or predetermined threshold.

(77) A method according to any clause herein, including prior to the indexing step, finger-jointing together a plurality of shorter said boards to form longer said boards.

(78) A method according to any clause herein, including planing the longer said boards to create planed said boards in the form of dimensioned lumber and/or so as to form said first and second boards.

(79) A method according to any clause herein, including prior to the indexing step, coating the first and second boards with a wood sealer.

(80) A method according to any clause herein, including prior to the indexing step and/or downstream of the planing step, measuring actual and/or instantaneous dimensions of the dimensioned lumber so planed in real-time.

(81) A method according to any clause herein, including prior to the indexing step and/or downstream of the planing step, measuring via a measuring machine or device the actual and/or instantaneous dimensions of the dimensioned lumber so planed in real-time.

(82) A method according to any clause herein, including within the customizing step, customizing and/or determining the size of the gap at least in part based on the actual and/or instantaneous dimensions of the dimensioned lumber so measured in real-time.

(83) A method according to any clause herein, including prior to the indexing step, determining and/or estimating the instantaneous moisture content of the first and second boards.

(84) A method according to any clause herein, including within the customizing step, customizing and/or determining the size of the gap at least in part based on the moisture content of the first and second boards so determined or estimated.

(85) A method according to any clause herein, including within the indexing step, selecting adjusting positioning of the positioning member via an actuator.

(86) A method according to any clause herein, including within the indexing step, indexing said positioning member via a linear actuator.

(87) A method according to any clause herein, including within the indexing step, indexing said positioning member via a ball screw.

(88) A method according to any clause herein, including within the indexing step, indexing the positioning member via an outfeed unit comprising one or more endless belts moveable along or substantially parallel to the first or outfeed axis and/or outfeed plane, and the positioning member coupling to the one or more endless belts.

(89) A method of manufacturing of nail-laminated timber (NLT), the method comprising: infeeding first and second boards into a press; customizing and/or adjusting a size of a gap between the first and second boards via a positioning member; next actuating of the press against the first and second boards so as to promote fixing in place of the size of said gap; and nailing together via a nail gun the first and second boards so fixed in place.

(90) A method of manufacturing of nail-laminated timber (NLT) comprising a plurality of boards, the method comprising: inputting into a processor desired dimensions of the NLT; indexing a positioning member to control, customize and/or adjust a size of a gap between adjacent said boards in real-time based on said desired dimensions of the NLT and one or more of real-time moisture content or actual dimensions of the boards; holding in place via a press the adjacent said boards so positioned; and nailing together via a nail gun the adjacent said boards so held in place.

(91) A method of manufacturing of nail-laminated timber (NLT) comprising a plurality of boards, the method comprising: customizing and/or adjusting a size of a gap between first and second said boards via a positioning member; fixing in place via a press the first and second boards so positioned; and nailing together via a nail gun the first and second boards so pressed in place.

(92) A method of manufacturing of nail-laminated timber (NLT) comprising a plurality of boards, the method comprising: biasing in place first and second said boards via a plurality of longitudinally spaced-apart biasing members moveable along a first or press axis which is generally or substantially perpendicular to a plane defined by the NLT and/or an outfeed axis and/or outfeed plane; and nailing together via one or more nail guns the first and second boards so biased.

(93) A method of manufacturing of nail-laminated timber (NLT) comprising a plurality of boards, the method comprising: actuating a press moveable along a first axis so as to selectively bias against first and second said layers of dimensioned lumber; nailing together via one or more nail guns the first and second said layers of dimensioned lumber so biased; and indexing an outfeed positioning member along a second axis generally or substantially perpendicular to the first axis so as to create a space to permit the press to receive a third said layer of dimensioned lumber for pressing with the second said layer of dimensioned lumber, with the one or more nail guns thereafter nailing together the third and second said layers of dimensioned lumber, wherein the positioning member so indexed being configured to adjust and/or customize a gap between adjacent said layers of dimensioned lumber in real-time.

(94) Apparatus including any new and inventive feature, combination of features, or sub-combination of features as described herein.

(95) Methods including any new and inventive steps, acts, combination of steps and/or acts or sub-combination of steps and/or acts as described herein.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A nail-laminated timber (NLT) manufacturing assembly comprising:

a wood planing machine via which boards are planed to create planed boards in the form of dimensioned lumber; and a NLT machine downstream of the wood planing machine, the NLT machine comprising i) a positioning member via which a size of a gap between adjacent planed boards is customized and/or adjusted, ii) a press, with actuation of the press promoting fixing in place of the adjacent boards so spaced, and iii) a nail gun which nails together the adjacent boards so spaced and pressed and/or held in place.

2. A nail-laminated timber (NLT) manufacturing assembly comprising:

a finger-jointing unit via which a plurality of shorter boards are finger jointed together to form longer boards; and a NLT machine downstream of the finger-jointing unit, the NLT machine comprising i) a positioning member via which a size of a gap between adjacent longer boards is customized and/or adjusted, ii) a press, with actuation of the press promoting fixing in place of the adjacent boards so spaced, and iii) a nail gun which nails together the adjacent boards so spaced and pressed and/or held in place.

3. A nail-laminated timber (NLT) manufacturing assembly comprising:

a wood coating unit via which boards are coated with a wood sealer; and a NLT machine downstream of the wood coating unit, the NLT machine comprising i) a positioning member via which a size of a gap between adjacent coated boards is customized and/or adjusted, ii) a press, with actuation of the press promoting fixing in place of the adjacent boards so spaced, and iii) a nail gun which nails together the adjacent boards so spaced and pressed and/or held in place.

4. A method of manufacturing a panel comprising nail-laminated timber (NLT) in the form of a plurality of nailed-together boards, the method comprising:

inputting into a processor desired dimensions of the panel;

forming a gap between adjacent boards via a positioning member, including indexing the positioning member to control, customize and/or adjust the size of the gap between said adjacent boards in real-time based on actual dimensions of the boards and said desired dimensions of the panel; and nailing together said adjacent boards so positioned to form of the plurality of nailed-together boards.

5. A method according to claim 4, including after the forming the gap step and prior to the nailing step, actuating a press against said adjacent boards so as to promote fixing in place of said adjacent boards and/or the size of said gap for the nailing step.

6. A method according to claim 4, including prior to the nailing step, fixing in place said adjacent boards so spaced via a plurality of longitudinally spaced-apart biasing members moveable along a first or press axis/plane which is generally substantially perpendicular to an outfeed axis/plane and/or nailing axis/plane.

7. A method of manufacturing a panel comprising nail-laminated timber (NLT) in the form of a plurality of nailed-together boards, the method comprising:

inputting into a processor desired dimensions of the panel;

forming a gap between adjacent boards via a positioning member, including indexing the positioning member to control, customize and/or adjust the size of the gap between said adjacent boards in real-time based on real-time moisture content of the boards and said desired dimensions of the panel; and nailing together said adjacent boards so positioned to form of the plurality of nailed-together boards.

8. A nail-laminated timber (NLT) machine for manufacturing a panel comprising NLT in the form of a plurality of nailed-together boards, the machine having a longitudinal axis and comprising:

an end stop member selectively moveable along said longitudinal axis based on a desired overall length of the panel;

a positioning member configured to customize and/or adjust a size of a gap between adjacent boards; and a nail gun configured to nail together the adjacent boards so spaced, wherein the positioning member customizes the size of the gap between successive said adjacent boards in real-time prior to the adjacent boards being fixed in place and nailed together, so as to manufacture the panel comprising NLT.

9. A nail-laminated timber (NLT) machine for manufacturing a panel comprising NLT in the form of a plurality of nailed-together boards, the machine having a longitudinal axis and comprising:

an end stop member selectively moveable along said longitudinal axis based on a desired overall length of the panel;

a positioning member configured to customize and/or adjust a size of a gap between adjacent boards, wherein the positioning member abuts with a first of the adjacent boards, with the positioning member being incrementally moveable in an outfeed direction thereafter to create a space substantially equal to said gap so sized and a thickness of a second of the adjacent boards, with the second of the adjacent boards being received in said space; and a nail gun configured to nail together the adjacent boards so spaced.

10. A machine according to claim 9, wherein the positioning member selectively adjusts the size of the gap between successive said adjacent boards in real-time prior to the adjacent boards being fixed in place and nailed together, so as to manufacture the panel comprising NLT.

11. A machine according to claim 9, including an actuator and an encoder operatively connected thereto, wherein each of the boards is biased against the end stop member via the actuator which receives feedback from the encoder, enabling constant or real-time length confirmation of the boards entering the machine.

12. A nail-laminated timber (NLT) machine for manufacturing a panel comprising NLT in the form of a plurality of nailed-together boards, the machine having a longitudinal axis and comprising:

an end stop member selectively moveable along said longitudinal axis based on a desired overall length of the panel;

a positioning member configured to customize and/or adjust a size of a gap between adjacent boards, wherein the positioning member is servo-controlled; and a nail gun configured to nail together the adjacent boards so spaced.

13. A nail-laminated timber (NLT) machine for manufacturing a panel comprising NLT in the form of a plurality of nailed-together boards, the machine having a longitudinal axis and comprising:

an end stop member selectively moveable along said longitudinal axis based on a desired overall length of the panel;

a positioning member configured to customize and/or adjust a size of a gap between adjacent boards;

a processor via which the positioning member is indexed, with the processor enabling the size of the gap to be programmable; and a nail gun configured to nail together the adjacent boards so spaced.

14. A nail-laminated timber (NLT) machine for manufacturing a panel comprising NLT in the form of a plurality of nailed-together boards, the machine having a longitudinal axis and comprising:

an end stop member selectively moveable along said longitudinal axis based on a desired overall length of the panel;

a positioning member configured to customize and/or adjust a size of a gap between adjacent boards;

a processor configured to adjust positioning of and/or index the positioning member and/or customize the size of the gap between respective said adjacent boards, based on desired overall dimensions of the panel; and a nail gun configured to nail together the adjacent boards so spaced.

15. A nail-laminated timber (NLT) machine for manufacturing a panel comprising NLT in the form of a plurality of nailed-together boards, the machine having a longitudinal axis and comprising:

an end stop member selectively moveable along said longitudinal axis based on a desired overall length of the panel;

a positioning member configured to customize and/or adjust a size of a gap between adjacent boards;

a processor configured to adjust positioning of and/or index the positioning member and/or customize the size of the gap, based at least in part on a moisture content of the adjacent boards; and a nail gun configured to nail together the adjacent boards so spaced.

16. A machine according to claim 15, including one or more of i) a moisture/humidity sensor for determining instantaneous moisture content of the adjacent boards, or ii) a weather application programming interface (API) integrated to obtain relative humidity level data or information in real-time from which wood moisture of the adjacent boards is determined and/or estimated; wherein the processor adjusts positioning of the positioning member and/or customizes the size of said gap, based at least in part on the moisture content of the adjacent boards so measured and/or determined.

17. A nail-laminated timber (NLT) machine for manufacturing a panel comprising NLT in the form of a plurality of nailed-together boards, the machine having a longitudinal axis and comprising:

an end stop member selectively moveable along said longitudinal axis based on a desired overall length of the panel;

a positioning member configured to customize and/or adjust a size of a gap between adjacent boards;

a processor configured to adjust positioning of and/or index the positioning member and/or customize the size of the gap, based one or more actual dimensions of the adjacent boards measured or determined in real-time; and a nail gun configured to nail together the adjacent boards so spaced.

18. A nail-laminated timber (NLT) machine for manufacturing a panel comprising NLT in the form of a plurality of nailed-together boards, the machine having a longitudinal axis and comprising:

an end stop member selectively moveable along said longitudinal axis based on a desired overall length of the panel;

a positioning member configured to customize and/or adjust a size of a gap between adjacent boards;

one or more linear actuators via which the positioning member is indexable along an outfeed axis/plane; and a nail gun configured to nail together the adjacent boards so spaced.

19. A machine according to claim 18, wherein each said linear actuator comprises a ball screw.

20. A nail-laminated timber (NLT) machine for manufacturing a panel comprising NLT in the form of a plurality of nailed-together boards, the machine having a longitudinal axis and comprising:

an end stop member selectively moveable along said longitudinal axis based on a desired overall length of the panel;

a positioning member configured to customize and/or adjust a size of a gap between adjacent boards;

a press, with actuation of the press promoting fixing in place of the adjacent boards so spaced; and a nail gun configured to nail together the adjacent boards so spaced and pressed and/or held in place.

21. A machine according to claim 20, wherein the positioning member is moveable along a first or outfeed axis/plane, and wherein the press is moveable along a second or press axis/plane generally or substantially perpendicular to the first or outfeed axis/plane.

22. A machine according to claim 20, wherein the press selectively biases only against thinner ends of the adjacent boards and wherein the nail gun inserts nails into thicker ends of the adjacent boards.

23. A machine according to claim 20, wherein the press selectively applies sufficient clamping pressure to the adjacent boards so as to inhibit bowing of the adjacent boards within a predetermined threshold.

24. A machine according to claim 20, wherein the press is moveable independent of the nail gun.

25. A machine according to claim 20, wherein the positioning member selectively adjusts the size of the gap between successive said adjacent boards in real-time prior to the adjacent boards being fixed in place and nailed together, so as to manufacture the panel comprising NLT.

* * * * *